(12) United States Patent
Broyles et al.

(10) Patent No.: US 12,102,940 B2
(45) Date of Patent: *Oct. 1, 2024

(54) REDUCING SURFACE AND BULK CONTAMINATION IN PLASTIC

(71) Applicant: The Procter & Gamble Company, Cincinnati, OH (US)

(72) Inventors: Norman Scott Broyles, Hamilton, OH (US); Dimitris Ioannis Collias, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,841

(22) Filed: Sep. 20, 2023

(65) Prior Publication Data

US 2024/0017188 A1 Jan. 18, 2024

Related U.S. Application Data

(63) Continuation of application No. 17/229,906, filed on Apr. 14, 2021, now Pat. No. 11,794,128.

(60) Provisional application No. 63/010,078, filed on Apr. 15, 2020.

(51) Int. Cl.
*B01D 11/02* (2006.01)
*B08B 3/04* (2006.01)
*B29B 17/00* (2006.01)
*B29B 17/02* (2006.01)
*B29K 105/26* (2006.01)
*C08J 11/08* (2006.01)
*C08J 7/02* (2006.01)

(52) U.S. Cl.
CPC ...... *B01D 11/0288* (2013.01); *B01D 11/0203* (2013.01); *B08B 3/04* (2013.01); *B29B 17/00* (2013.01); *C08J 11/08* (2013.01); *B01D 11/0292* (2013.01); *B08B 2220/00* (2013.01); *B08B 2240/00* (2013.01); *B29B 2017/0015* (2013.01); *B29B 2017/0289* (2013.01); *B29B 2017/0293* (2013.01); *B29K 2105/26* (2013.01); *C08J 7/02* (2013.01); *C08J 2300/30* (2013.01)

(58) Field of Classification Search
CPC . B01D 11/0203; B01D 11/0288; B29B 17/00; Y02W 30/62
See application file for complete search history.

(56) References Cited

U.S. PATENT DOCUMENTS

| | | |
|---|---|---|
| 5,198,471 A | 3/1993 | Nauman et al. |
| 5,233,021 A | 8/1993 | Sikorski |
| 5,368,796 A | 11/1994 | Lorenz et al. |
| 5,540,244 A | 7/1996 | Brooks et al. |
| 5,554,657 A | 9/1996 | Brownscombe |
| 5,739,270 A | 4/1998 | Farmer et al. |
| 5,780,520 A | 7/1998 | Reeves et al. |
| 6,369,192 B1 | 4/2002 | Dufresne |
| 6,555,588 B2 | 4/2003 | Gorski et al. |
| 7,935,736 B2 | 5/2011 | Maeurer et al. |
| 9,616,595 B2 | 4/2017 | Fullana Font et al. |
| 9,834,621 B2 | 12/2017 | Layman et al. |
| 9,890,225 B2 | 2/2018 | Layman et al. |
| 10,022,725 B2 | 7/2018 | Kulesa et al. |
| 10,442,912 B2 | 10/2019 | Layman |
| 10,450,436 B2 | 10/2019 | Layman |
| 10,465,058 B2 | 11/2019 | Layman |
| 10,899,906 B2 | 1/2021 | Layman et al. |
| 10,961,366 B2 | 3/2021 | Layman et al. |
| 11,130,850 B2 | 9/2021 | Castaneda Zuniga |
| 11,628,379 B2 | 4/2023 | Broyles et al. |
| 11,794,128 B2 | 10/2023 | Broyles et al. |
| 2003/0146547 A1 | 8/2003 | Fischer et al. |
| 2009/0178693 A1 | 7/2009 | Turner et al. |
| 2009/0209667 A1 | 8/2009 | Thompson et al. |
| 2010/0236580 A1 | 9/2010 | Delaurentiis |
| 2011/0245457 A1 | 10/2011 | Rougelot et al. |
| 2014/0148625 A1 | 5/2014 | Mathys et al. |
| 2017/0002115 A1 | 1/2017 | Layman |
| 2017/0081481 A1 | 3/2017 | Erbes et al. |
| 2018/0171095 A1 | 6/2018 | Layman et al. |
| 2018/0171096 A1 | 6/2018 | Layman et al. |
| 2018/0171097 A1 | 6/2018 | Layman et al. |
| 2021/0322894 A1 | 10/2021 | Broyles et al. |
| 2021/0324170 A1 | 10/2021 | Broyles et al. |
| 2023/0219016 A1 | 7/2023 | Broyles et al. |
| 2023/0249101 A1 | 8/2023 | Broyles et al. |

FOREIGN PATENT DOCUMENTS

| | | |
|---|---|---|
| CN | 101367957 A | 2/2009 |
| CN | 102516586 A | 6/2012 |
| CN | 102557883 A | 7/2012 |
| CN | 105479621 A | 4/2016 |
| DE | 19651571 A1 | 6/1998 |
| DE | 19958018 A1 | 6/2001 |

(Continued)

OTHER PUBLICATIONS

Sorema S.r.l., "Plastic Washing Systems—The Plastic Washing Line", 2021 p. 6, retrieved from http://sorema.it/en_US/applications/washing-line/.

(Continued)

*Primary Examiner* — Bradley R Spies

(74) *Attorney, Agent, or Firm* — Kathleen Y. Carter; James E. Oehlenschlager

(57) ABSTRACT

The present invention generally relates to a method of reducing contamination from plastics. The resulting purer plastic can be used in demanding applications.

11 Claims, No Drawings

(56) References Cited

FOREIGN PATENT DOCUMENTS

| | | |
|---|---|---|
| EP | 0849312 A1 | 6/1998 |
| EP | 2384873 A1 | 11/2011 |
| EP | 3418328 A1 | 12/2018 |
| EP | 3562640 B1 | 10/2020 |
| JP | S5813089 B2 | 3/1983 |
| WO | 2018118575 A1 | 6/2018 |
| WO | 2018118578 A1 | 6/2018 |
| WO | 2018118579 A1 | 6/2018 |

OTHER PUBLICATIONS

"RPC a sustainable future with plastic through innovation", Responsibility Report 2019, available online on www.rpc-group.com, date unknown, 16 pages.
PCT Search Report and Written Opinion for PCT/US2021/027180 dated Aug. 25, 2021, 15 pages.
All Office Actions, U.S. Appl. No. 17/229,901, filed Apr. 14, 2021.
All Office Actions, U.S. Appl. No. 17/229,903, filed Apr. 14, 2021.
All Office Actions, U.S. Appl. No. 17/229,906, filed Apr. 14, 2021.
All Office Actions; U.S. Appl. No. 18/114,412, filed Feb. 27, 2023.
All Office Actions; U.S. Appl. No. 18/127,086, filed Mar. 28, 2023.
All Office Actions; U.S. Appl. No. 18/215,275, filed Jun. 28, 2023.
Cadel De-inking "The Deinking Process", 2021, p. 9, retrieved from http://cadeldeinking.com/en/.
Gecol, Hatice, et al. "Deinking of water-based ink printing from plastic film using nonionic surfactants." Journal of Surfactants andDetergents 5.4, 2002, pp. 363-374.
Green, Don W., and Robert H. Perry. Perry's chemical engineers' handbook, "McGraw-Hill Education", 2008, pp. 18-55 to 18-58.
Herbold Meckesheim GmbH , "Washing Lines For Washing, Separating, Drying", 2019, pp. 3, retrieved from https://www.herbold.com/en/machines/washing-separating-drying-2/.
InterRema Refresher, "High-Efficiency Anti-Odour Technology" retrieved from https://www.erema.com/en/refresher/ pp. 19, 2016.
Lindner Washtech GmbH, "Strong System Components for Customised Facilities", 2020, pp. 12, retrieved from https://www.lindnerwashtech.com/system-solutions.
Pivnenko K et al: "Recycling of plasticwaste: Presence of phthalates in plasticsfrom households and industry",Waste Management, Elsevier, New York, NY, US,vol. 54, Jun. 11, 2016, pp. 44-52.
S.M. Al-Salem, P. et al., Waste Management, Oct. 29, 2009, 2625-2643.
Sofia Chanioti et al. Food Engineering Handbook "Solid Liquid Extraction" from Food Engineering Handbook, Chapter 6, edited by Theodoros Varsakas and Constantina Tzia, Sofia Chanioti, George Liadakis, and Constantina Tzia, dated Dec. 17, 2014, 34 pages.
SUSTΛNETM—The ECO Serie, S.Pohlmann RPC bpi nordfolien 2018, date unknown, 12 pages.
Unpublished U.S. Appl. No. 18/215,275, filed Jun. 28, 2023, to Dimitris Ioannis Collias et al.
Ugouler Sibel et al: "Challenges and opportunities of solvent-based additive extraction methods for plastic recycling", Waste Management, Elsevier, New York, NY, US, vol. 104, Jan. 22, 2020, pp. 148-182.
Velzen et al., "Solvent extraction as additional purification method for post-consumer plastic packaging waste", No. 1261, Published on Jun. 28, 2011, 16 pages.
Ügdüler et al., "Understanding the complexity of deinking plastic waste: An assessment of the efficiency of different treatments to remove ink resins from printed plastic film", Journal of Hazardous Materials, vol. 452, accepted on Mar. 16, 2023, 16 pages.
All Office Actions; U.S. Appl. No. 18/624,512, filed Apr. 2, 2024.
All Office Actions; U.S. Appl. No. 18/624,541, filed Apr. 2, 2024.
All Office Actions; U.S. Appl. No. 18/643,339, filed Apr. 23, 2024.
Nilsson Gustav, "Assessment of Organic Pollutants in Landfill Leachate Future Screening and Characterization", Chalmers University of Technology, Online retrieved from "https://odr.chalmers.se/items/768611aO-8fd7-4c64-9f6a-84308531e9c5", 2013, 101 Pages.
Unpublished U.S. Appl. No. 18/624,512, filed Apr. 2, 2024, to Dimitris Ioannis Collias et. al.
Unpublished U.S. Appl. No. 18/624,541, filed Apr. 2, 2024, to Dimitris Ioannis Collias et. al.
Unpublished U.S. Appl. No. 18/643,339, filed Apr. 23, 2024, Norman Scott Broyles et al.

REDUCING SURFACE AND BULK CONTAMINATION IN PLASTIC

FIELD OF THE INVENTION

The present invention generally relates to a method of producing a purer plastic from a first plastic. More specifically, the first plastic is subjected to bulk purification or surface and bulk purifications, wherein the total contamination present in the first plastic is reduced. The resulting purer plastic is sufficiently purer to allow for potential use in demanding applications.

BACKGROUND OF THE INVENTION

Synthetic plastics are ubiquitous in daily life due to their relatively low production costs and good balance of material properties. They are used in a wide variety of applications, such as packaging, automotive components, medical devices, and consumer goods. To meet the high demand of these applications, hundreds of millions of tons of synthetic plastics are produced globally on an annual basis. The overwhelming majority of synthetic plastics are produced from increasingly scarce fossil sources, such as petroleum and natural gas. Additionally, the manufacturing of synthetic plastics from fossil sources causes the emission of greenhouse gases (GHG), primarily $CO_2$, in the atmosphere.

The ubiquitous use of synthetic plastics has consequently resulted in millions of tons of plastic waste being generated every year. While the majority of plastic waste is landfilled via municipal solid waste programs, a significant portion of plastic waste is found in the environment as litter, which is unsightly and potentially harmful to ecosystems. Also, plastic waste is leaked into the environment, e.g. washed into river systems and ultimately out to sea.

Plastics recycling has emerged as one solution to mitigate the issues associated with the poor management of the end-of-life of plastics. Recovering and re-using plastics diverts waste from landfills and reduces the demand for virgin plastics made from fossil sources, which consequently reduces GHG emissions. In developed regions of the world, such as the United States and the European Union, rates of plastics recycling are increasing due to greater awareness by consumers, businesses, and industrial manufacturing operations, and due to regulatory frameworks. The majority of recycled materials, including plastics (other than films), are mixed into a single stream which is collected and processed by a material recovery facility (MRF). At the MRF, materials are sorted, washed, and packaged (e.g. in bales) for resale. Plastics can be sorted into individual materials, such as single streams of high-density polyethylene (HDPE) and poly(ethylene terephthalate) (PET), or mixed streams of other common plastics (such as polypropylene (PP), low-density polyethylene (LDPE), poly(vinyl chloride) (PVC), polystyrene (PS), polycarbonate (PC), and polyamide (PA)). The single or mixed streams can then be further sorted, washed, and reprocessed at a plastics recovery facility (PRF) into pellets that are suitable for re-use in plastics processing, e.g., extrusion blow molding, profile extrusion, injection molding, and film making.

However, the utilization of these recycled plastics is currently limited due to contamination, which renders the plastics less valuable compared to virgin plastics. A key to increasing the recycle rates and lowering the $CO_2$ emissions and plastics pollution is to reduce the contamination to a level allowing broader utilization across more end markets, especially those involving demanding applications requiring low contamination.

Films are a special case of recycled plastics and are predominately polyolefin in composition. Films offer unique challenges for recycling that have yet to be resolved. The recycled film supply stream can be split into two general categories: 1) pre-consumer recycle film, which includes both in-plant scrap/edge-trim that can be re-used in the same process that generated it and post-industrial recycle (PIR) film, which is film generated by internal plant waste that is not used in the same process that produced it; 2) post-consumer recycle (PCR) film including post-commercial recycle film, which is film that has been used in commerce but not directly by at-home consumers (e.g. back-of-store shrink wrap, pallet wrap, wholesale bags, furniture wrap, agricultural film, etc.) and post-household recycled film, which is film that has been used in commerce directly by at-home consumers (e.g. retail bags, retail food packaging, overwraps for diapers and hygiene products, trash bags, etc.). Post-industrial film waste for use in recycling is collected on a plant-by-plant basis for controlled end markets and may or may not involve (or require) significant cleaning steps before recycling. Post-commercial film is collected at the point of sale and transported to various PRFs specializing in film for various cleaning operations and eventual distribution to an end market. In the US, post-household film is primarily collected in store take-back programs where the end consumer returns the film to a collection bin at a local store. Film-based PRFs collect the film waste and deliver it to end markets after sortation and cleaning. The utilization of film recycled materials is quite limited due to contamination. The contamination of films is higher than other forms due to the high surface area to volume ratio which allows greater opportunity for external contamination. Currently, most film-based recycled plastics are down-cycled into markets that are not circular and are of limited size such as plastics lumber. As the collection of film-based waste grows, the need for end markets beyond plastics lumber is essential. Ideally, film-based waste will eventually discover a second life in film-based applications, thus ensuring ongoing circularity.

The end markets cannot grow unless contamination is greatly reduced. Considering the high volume of film that is used in the demanding applications, it is important that recycled plastics coming from these markets re-enter the same end markets to support circularity. As such, the ability to remove even greater levels of contaminants is critical to achieving circularity and reducing $CO_2$ emissions and plastics pollution. Plastics pollution is even more problematic for film considering the tremendous surface area per use and the mobility of the waste in the environment by both air and water.

While contamination is problematic for all end market applications, demanding applications have even stricter requirements especially on certain chemical contaminants. The relevant chemical contaminants are grouped into various chemical classes depending on the chemical structure of the contaminants. Non-limiting examples of these chemical classes of contaminants are heavy metals, pesticides, dioxins, furans, polychlorinated biphenyls (PCBs), phthalates, polycyclic aromatic hydrocarbons (PAHs), organotins, bisphenols, isothiazolins, glyphosphate, alkyl phenols, alkylphenol ethoxylates, aromatic amines, and flame retardants. In addition, the target levels of these contaminants can be extremely low. For instance, the target levels may be on the order of parts per million (ppm), parts per billion (ppb), and parts per trillion (ppt), wherein the initial contaminated plastic may contain levels 1,000 times the targeted levels. Net, a 1,000× reduction in chemical contamination is often required.

Mechanical recycling, also known as secondary recycling, is a process of converting recycled plastic waste into a re-usable form for subsequent manufacturing. A more detailed review of mechanical recycling and other plastics recovery processes are described in S. M. Al-Salem, P. et al., *Waste Management*, 29(10) (2009), 2625-2643. Mechanical recycling of rigid plastics typically involves some form of surface washing followed by drying and melt densification. The melt densification step typically includes melt filtration and devolatilization. For film-based materials, there are dry and wet processes. In the dry process, a controlled film stream is typically shredded, dried, and then melt extruded into the final form. Melt filtration and devolatilization are typically part of the extrusion step. In wet processes, a controlled film stream is typically shredded, washed in an aqueous solution/solutions, dried, and then melt extruded into the final form. Melt filtration and devolatilization are typically part of the extrusion step. The above methods are generally acceptable at removing intentional surface contamination such as paper labels and unintentional surface contamination such as dirt but are poor at removing bulk contaminants.

U.S. Pat. No. 10,022,725 discloses a mechanical recycling method for cleaning linear low-density polyethylene (LLDPE)/LDPE film for use in recycling. The patent further discloses the steps of shredding, a first water washing step, a second size reduction step involving wet grinding, a friction washing step or steps where hot water is used in at least one step, a drying or multiple drying steps, and a compaction step. The method is likely to be quite effective at removing some surface contamination that is loosely bound but will be ineffective at removing bulk contamination due to extremely low solubility of the bulk contaminants in the aqueous washing media and/or limited diffusivity of the bulk contaminants within the plastic.

U.S. Pat. No. 9,616,595 discloses a mechanical recycling method for de-inking surface-printed plastic films. The patent further discloses steps of grinding, ink removal steps, general washing, recovery of the cleaning solution, recovering pigments, and drying. The ink removal step involves the use of an aqueous cleaning fluid with high pH and selective cleaning agents, such as dodecyl sulfate, and high turbulence. The method claims ability to remove surface printed ink, which potentially contributes to chemical contamination following heating in the recycling process. The process will have limited ability to remove bulk contaminants due to limited solubility of the bulk contaminants in the aqueous washing media and/or limited diffusivity of the bulk contaminants within the plastic.

To overcome the fundamental limitations of mechanical recycling, there have been many methods developed to purify contaminated plastics. Most of these methods use solvents to decontaminate and purify plastics. U.S. Pat. No. 7,935,736 discloses a method for recycling polyester from plastic waste using a solvent to dissolve the polyester prior to cleaning. This patent also discloses the need to use a precipitant to recover the polyester from the solvent.

U.S. Pat. No. 6,555,588 discloses a method to produce a polypropylene blend from a plastic mixture comprising other polymers. This patent discloses the extraction of contaminants from a polymer at a temperature below the dissolution temperature of the polymer in the selected solvent, such as hexane, for a specified residence time. The starting material is a porous pellet and the extraction conditions are below the melting temperature to enable conveyance in the process. This patent further discloses increasing the temperature of the solvent (or a second solvent) to dissolve the polymer prior to filtration. Further, the patent discloses the use of shear flow to precipitate polypropylene from solution. The polypropylene blend described in the patent contained up to 5.6 wt. % polyethylene contamination.

European Patent Application No. 849,312 discloses a process to obtain purer polyolefins from a polyolefin-containing plastic mixture or a polyolefin-containing waste. The patent application discloses the extraction of polyolefin mixtures or wastes with a hydrocarbon fraction of gasoline or diesel fuel with a boiling point above 90° C. at temperatures between 90° C. and the boiling point of the hydrocarbon solvent. The patent application further discloses contacting a hot polyolefin solution with bpacked leaching clay and/or activated carbon to remove foreign components from the solution. Also, the patent application discloses cooling the solution to temperatures below 70° C. to crystallize the polyolefin and then removing adhering solvent by heating the polyolefin above its melting point, or evaporating the adhering solvent in a vacuum, or passing a gas stream through the polyolefin precipitate, and/or extraction of the solvent with an alcohol or ketone that boils below the melting point of the polyolefin.

U.S. Pat. No. 5,198,471 discloses a method for separating polymers from a physically commingled solid mixture (for example, waste plastics) containing a plurality of polymers using a solvent at a first lower temperature to form a first single-phase solution and a remaining solid component. The patent further discloses heating the solvent to higher temperatures to dissolve additional polymers that were not solubilized at the first lower temperature. Finally, the patent discloses filtration of insoluble polymer components.

U.S. Pat. No. 5,233,021 discloses a method of extracting pure polymeric components from a multi-component structure (for example, waste carpeting) by dissolving each component at an appropriate temperature and pressure in a supercritical fluid and then varying the temperature and/or pressure to extract particular components in sequence. However, similar to the U.S. Pat. No. 5,198,471, this patent only discloses filtration of undissolved components.

U.S. Pat. No. 5,739,270 discloses a method and apparatus for continuously separating a polymer component of a plastic from contaminants and other components of the plastic using a co-solvent and a working fluid. The co-solvent, at least partially, dissolves the polymer and the second fluid (that is in a liquid, critical, or supercritical state) solubilizes components from the polymer and precipitates some of the dissolved polymer from the co-solvent. The patent further discloses the step of filtering the thermoplastic co-solvent (with or without the working fluid) to remove particulate contaminants, such as glass particles.

U.S. Pat. No. 5,368,796 discloses a method for surface cleaning polyethylene films. The patent further discloses the steps of shredding, a first surface washing step (involving a boiling solvent at a temperature below the melting temperature of the polyethylene and at or near ambient pressure, while applying vigorous mechanical agitation for 30 min to rub the ink off), a second surface washing step (involving fresh solvent below the melting temperature of the polyethylene, while applying vigorous mechanical agitation for 30 min), a third surface washing step (involving the solvent below the melting temperature of the polyethylene, while applying vigorous mechanical agitation for 30 to 60 min, and devolatilization), and melt densification. Optionally, the method may include a water washing step prior to treatment with solvent to remove surface dirt. The patent further discloses that the solvent washing accomplishes extraction wherein the solvent does not dissolve the polymer. However, a small amount of wax, typically <1 wt. % may be removed. The solvent washing and extraction steps are further disclosed as occurring at the boiling point of the solvent, which is selected to be below the softening point of the polyethylene to avoid agglomeration. The above method is focused on the removal of surface printed inks and is silent on the removal of bulk permeable contaminants such as those described previously.

U.S. Patent Application No. 2009/0178693 discloses a method for purifying a plastic. The patent application further discloses a multi-step process involving granulation to form plastic chips, surface washing with supercritical $CO_2$, surface washing and extraction with a high boiling solvent or mixture of solvents (such as limonene and ethylene lactate), a final surface washing with supercritical $CO_2$ to remove the high boiling solvent on the surface, and devolatilization. Further disclosed is that the plastic chip feed material is stirred with the solvent and the shape of the chip is maintained. Also, it is disclosed that the recovered material remains as chips, which implies the process is completed at temperatures below the plastic's primary melting point.

U.S. Pat. No. 9,834,621 discloses a method for purifying polypropylene. The patent further discloses contacting the reclaimed polypropylene at a temperature from about 80° C. to about 280° C. and at a pressure from about 10 atm to about 544 atm with a first fluid solvent having a standard boiling point less than about 70° C., to produce an extracted reclaimed polypropylene; dissolving the extracted reclaimed polypropylene in a solvent selected from the group consisting of the first fluid solvent, a second fluid solvent, and mixtures thereof, at a temperature from about 90° C. to about 280° C. and a pressure from about 14 atm to about 544 atm to produce a first solution comprising polypropylene, at least one dissolved contaminant, and at least one suspended contaminant; settling the first solution comprising polypropylene, at least one dissolved contaminants, and at least one suspended contaminant at a temperature from about 90° C. to about 280° C. and at a pressure from about 14 atm to about 544 atm to produce a second solution comprising polypropylene, at least one dissolved contaminant, and less of the at least one suspended contaminant; filtering the second solution at a temperature from about 90° C. to about 280° C. and at a pressure from about 14 atm to about 544 atm to produce a third solution comprising purer polypropylene, at least one dissolved contaminant, and even less of the at least one suspended contaminant; and separating the purer polypropylene from the third solution; and where the second fluid solvent has the same chemical composition or a different chemical composition as the first fluid solvent. The above method is highly suitable for removing contamination. However, the ability to dissolve, settle, and filter plastics is quite difficult and may not be feasible or practical for plastics with high molecular weight (MW), such as those used in films and blow molded containers. In addition, the above method is silent on removing surface contamination prior to extraction and dissolution, thus increasing the burden on such disclosed processes, especially filtration.

In summary, the solvent-based methods to purify contaminated plastics, as described above, do not address the issue of removing both surface and bulk contaminants from plastics sufficiently and efficiently to enable utilization in sensitive packaging and product applications, particularly in films and rigid applications involving high MW plastics. Accordingly, there is a need for a method that: 1) produces a purer plastic, i.e., plastic without a significant amount of contamination; 2) is relatively simple in terms of the number of unit operations; and 3) can be used in high MW plastics, such as those sourced from film and rigid applications.

SUMMARY OF THE INVENTION

A method to extract contaminates from a first plastic to produce a purer plastic is provided that comprises providing a first plastic comprising individual contaminants, each individual contaminant having a concentration; extracting said individual contaminates from said first plastic at a temperature and a pressure, using a leaching solvent, in extraction stages, for a period of time and for a period of time per stage, to produce a purer plastic comprising individual contaminates, each having a concentration; wherein said extraction is packed leaching wherein said temperature is below the primary melting point of the first plastic; wherein said extraction stages are conducted at a leaching solvent to first plastic mass ratio; wherein said leaching solvent to first plastic mass ratio per stage and at any point in time is less than about 5:1; wherein said pressure is between about atmospheric and 1,000 atm; wherein said first plastic individual contaminants comprise at least one of alkyl phenols, bisphenols, dioxins, PCBs, and phthalates; wherein each individual contaminate concentration in said purer plastic is reduced compared to each individual contaminate concentration in said first plastic; and wherein the average of said reductions of said concentrations of said first plastic contaminants to said purer plastic contaminants is at least about 55% or LOQ.

DETAILED DESCRIPTION OF THE INVENTION

I. Definitions

As used herein, the term "plastic" refers to polymers, such as polyethylene (PE), PP, PET, LLDPE, LDPE, HDPE, polyethylene co-polymers. For the purposes of the present invention, the terms "polymer" and "plastic" are used interchangeably, and the term "MW" refers to the weight-average molecular weight of the polymer.

As used herein, the term "reclaimed plastic" refers to re-grind, post-industrial, post-commercial, or post-household plastic of various forms including film, fiber, nonwoven, and rigid packaging.

As used herein, the term "recycled plastic" refers to reclaimed plastic converted to a form that is used in making products and packaging either in blends with virgin plastic or by itself. The recycled plastic may be purer than the reclaimed plastic or may be identical except in form.

As used herein, the term "first plastic" refers to the plastic which is fed into the purification process and has a level of contamination that may include both surface and bulk contamination. Non-limiting examples of first plastic are reclaimed film and reclaimed HDPE bottles.

As used herein, the term "purer plastic" refers to the plastic which is produced by the purification process from a first plastic. The purer plastic has a level of contamination that is generally lower than that of the first plastic.

As used herein, the term "1$^{st}$ Life plastic" refers to a virgin plastic that has not been utilized in its polymer form for any purpose.

As used herein, the term "contaminant" refers to any undesirable material contained on or within the plastic. The term "chemical contaminant" refers to any undesirable chemical species on the surface of the plastic or within the bulk of the plastic and comprises the molecular or elemental composition of the contaminant. The terms may be used interchangeably depending upon the intent. For example, paper contamination comprises cellulose. Net, cellulose would be one chemical contaminant within the paper contaminant. As used herein, the term "contamination" refers to the sum of all contaminants and the term "chemical contamination" refers to the sum of all chemical contaminants. The chemical contaminants are grouped in classes, which include chemical contaminants that have similar chemical structure. For example, As, Hg, and Cr are chemical contaminants in the "heavy metals" classification. Each contaminant may have different chemical attributes, such as solubility and diffusivity in the plastic, and target levels depending upon concentration and end use market.

As used herein, the term "surface contaminant" refers to a contaminant that is on the surface of the plastic. Similarly, the term "surface chemical contaminant" refers to the molecular or elemental composition of the surface contaminant. The surface contaminant may be attached to the surface of the plastic either loosely through physical attraction forces, or more strongly through polar or other forces. In general, a surface contaminant will have less than about 80% of its surface area embedded in the plastic.

As used herein, the term "bulk contaminant" refers to a contaminant that is in the bulk of the plastic. Similarly, the term "bulk chemical contaminant" refers to the molecular or elemental composition of the bulk contaminant. In general, a bulk contaminant will have more than about 80% of its surface area embedded in the plastic.

As used herein, the term "surface contamination" and "surface chemical contamination" refers to the sum of all surface contaminants and all surface chemical contaminants, respectively.

As used herein, the term "bulk contamination" and "bulk chemical contamination" refers to the sum of all bulk contaminants and all bulk chemical contaminants, respectively.

As used herein, the term "total contamination" refers to the sum of the surface contamination and bulk contamination and the sum of all the surface chemical contamination and bulk chemical contamination, respectively.

As used herein, the term "permeable contaminant" refers to a chemical contaminant that is both soluble and diffusible in the plastic. Non-limiting examples of permeable contaminants are formaldehyde, bisphenol A, and naphthalene.

As used herein, the term "impermeable contaminant" refers to a chemical contaminant that is either insoluble or non-diffusible in the plastic. Non-limiting examples of impermeable contaminants are heavy metals and gel particles composed of cross-linked or ultra-high molecular weight plastic (too large to diffuse).

As used herein, the term "permeable contamination" is the sum of all permeable contaminants and the term "impermeable contamination" is the sum of all impermeable contaminants. The sum of all permeable and impermeable contamination is the "chemical contamination" if described in molecular or elemental terms or just simply "the contamination" if described in general terms (such as cellulose vs paper).

As used herein, the term "intentional contaminant" refers to a contaminant that is intentionally added by the supply chain for a specific purpose to benefit the producer, retailer, or consumer, but may not be desired in the recycled plastic. As used herein, the term "intentional chemical contaminant" refers to an intentional contaminant described by its chemical composition. As used herein, the term "intentional contamination" refers to the sum of all intentional contaminants and the term "intentional chemical contamination" refers to the intentional contamination described by its chemical composition.

As used herein, the surface area to volume ratio of the a plastic is calculated as follows: For generally spherical objects like pellets, ground pellets, micronized pellets, etc., the surface area to volume ratio is calculated by $3/r$; where r is the mass average radius. For generally flat and thin objects like film, the surface area to volume ratio is calculated by $2/t$; where t is the mass average thickness. For generally long columnar objects like fibers, the surface area to volume ratio is calculated by $2/r$; where r is the mass average radius.

As used herein, the term "unintentional contaminant" refers to any contaminant not intentionally added. Examples include dirt and cross-contamination that is not intentionally added by the producer, retailer, or consumer. As used herein, the term "unintentional chemical contaminant" refers to an unintentional contaminant described by its chemical composition. As used herein, the term "unintentional contamination" refers to the sum of all unintentional contaminants and the term "unintentional chemical contamination" refers to the unintentional contamination described by its chemical composition.

As used herein, the term "densified" refers to a state of plastic in which the bulk density of the plastic is higher than the bulk density of the original/pre-densified plastic and the original surface of the plastic is reduced and/or rendered inaccessible to wetting fluids. The process of producing a densified material is referred to as densification.

As used herein, the term "melt densification" refers to densification done near, at, or above the primary melting point of the plastic. Non-limiting methods of melt densification include melt extrusion and agglomeration with equipment, such as the Herbold HV series plastcompactor.

As used herein, the term "primary melting point" refers to the peak melting point (highest endothermic peak on a zero-slope baseline) of the plastic as measured using Differential Scanning calorimetry (DSC). For the purposes of the present invention, the terms "primary melting point", "melting point", "melting temperature", and "primary melting temperature" are used interchangeably. For amorphous materials and/or materials lacking a distinct melting point, the defining temperature will be the approximate softening point of the material, which may be best characterized by the glass transition temperature. Those skilled in the art will understand the appropriateness of the criteria for non-semi-crystalline materials.

As used herein, the term "hexanes" refers to a blend of hexane isomers, such as normal hexane (at least 45 vol %, and typically, about 53 vol %), iso hexane (2-methylpentane, 3-methylpentane, and 2,3-dimethylbutane), and neo hexane (2,2-dimethylbutane).

As used herein, the term "limit of quantification" or "LOQ" refers to the lower detection limit for a given chemical contaminant as determined by the analytical methods disclosed in section IX. The LOQ is a function of the methods used and may vary from test method to test method. The LOQ used herein is specific to the method listed in section IX.

As used herein, the term "ppm" refers to parts per million, "ppb" refers to parts per billion, and "pptr" refers to parts per trillion.

II. First Plastic

Plastics are predominately free of contamination (virgin plastics) when first produced at resin suppliers, such as Dow, Nova, ExxonMobil, etc. However, during the plastic's lifecycle contamination is introduced either intentionally or unintentionally.

Non-limiting examples of intentional contamination include surface print, paper labels, adhesives for labels, pigments (such as $TiO_2$), process additives (such as antioxidant (AO)), etc., that are necessary for marketing, branding, processability, and/or end use performance. Non-limiting examples of unintentional contamination are dirt, cross-contamination, certain heavy metals, pesticides, dioxins, furans, PCBs, etc. Also, unintentional contamination can be produced from reactions involving intentional contaminants, such as the oxidation of paper labels to dioxins, degradation of adhesives or print binders, etc. Most of the latter occurs during melt densification methods used during the recycling process. Further, oxidation of the plastic during melt processing steps, such as those used for original package or product creation and/or latter recycling, will produce unintentional contamination, such as gels. In addition, unintentional contamination may result from interaction with products. For example, packaging materials that contain cleaning mixtures (e.g. limonene, surfactants, etc.), food (e.g. various organics), etc., will potentially become contaminated with such products. Finally, unintentional contamination can enter the plastic during production, e.g. contamination of a plastic with reaction by-products, unreacted monomers, etc.

It is recognized that different reclaimed plastic sources have different contamination and associated risks. Clearly, reclaimed plastic streams of unknown origin and lifecycle will be most abundant but also represent the highest potential for contamination. On the other side, controlled reclaimed plastic streams are available and represent lower potential risk for demanding applications.

Pre-consumer plastic generally has the lowest level of contamination due to its known composition and controlled history. It may include intentional contamination, such as surface print and opacifiers, but because these are known and controlled, it is quite easy to find applications tolerating such known contaminants. In addition, pre-consumer plastic tends to have low amounts of unintentional contamination due to the controlled history preventing external contamination. Thus, pre-consumer plastics that were originally destined for use in demanding applications will be ideal sources of reclaimed plastic for the same end markets with minimal cleaning/purification. The latter pre-consumer plastic in the form of film is referred to as "Approved Sourced Post-Industrial Film" (ASPIF). On the downside, the ASPIF stream is very limited in supply and does not support circularity.

Post-consumer plastics are generally more contaminated than pre-consumer plastics. The post-commercial subclass of post-consumer plastic has the next lowest level of contamination relative to pre-consumer recycle considering the somewhat controlled life cycle within the commerce supply chain. In general, post-commercial reclaim plastic will have a known and controlled level of intentional contamination, thus enabling broad utilization as reclaimed plastic. However, unintentional contamination is known to be ubiquitous and problematic with this stream, which prevents broad usage in demanding applications. Post-commercial plastic that is sourced from demanding applications, will be potentially usable back into these fields following adequate cleaning/purification. Post-commercial plastic sourced from demanding applications in film form is referred to as "Approved Source Post-Commercial Film" (ASPCF). To accommodate the on-going need of purer reclaimed plastic, recycle material suppliers have recently introduced post-commercial film sources with more controlled and known history. These new sources are called High-Custody sources and are primarily utilized with the post-commercial film stream. Net, High-Custody Post-Commercial film sources should have reduced level of contamination relative to general Post-Commercial film sources. On the downside, these High-Custody sources are of limited volume and are more costly.

The post-household subclass of post-consumer has the highest level of contamination considering the uncontrolled life cycle within the commerce channel. Such plastic has high levels of both intentional and unintentional contamination that is highly variable, unknown, and uncontrolled. Such plastic may include plastic sources that were originally unacceptable for use in demanding applications. As such, there are limited markets for this plastic source and essentially none in the demanding applications.

Surprisingly, plastics made purer by the present invention may allow source plastics from post-industrial (both ASPIF and uncontrolled source), post-commercial (both ASPCF and uncontrolled source), and post-household plastic to be used more broadly in the demanding applications. In addition, most customers of all types desire purer materials beyond what is available today and the purer plastics of the present invention meet this broader need for purer plastics from any source.

For the purposes of the present invention, non-limiting examples of plastic are film, sheet, injection molded parts, blow molded parts, fiber, nonwovens, wovens, thermoformed parts, and extruded strands.

The first plastic can be a virgin plastic or a reclaimed plastic. Also, the first plastic can be a first-life plastic (has been used only once before it entered the reclaimed plastic stream), second-life plastic (has been used twice before it entered the reclaimed plastic stream), or higher-life plastic (has been used many times before it entered the reclaimed plastic stream). In embodiments of the present invention, the first plastic comprises a reclaimed plastic. In another embodiment of the present invention, the first plastic comprises a virgin plastic. In one embodiment of the present invention, the first plastic comprises film. In yet another embodiment of the present invention, the first plastic is selected from the group comprising film, injection molded part, blow molded part, fiber, nonwoven, woven, thermoformed part, extruded strand, or mixtures thereof.

In embodiments of the present invention, the first plastic comprises a regrind/edge-trim/in-plant waste plastic. In another embodiment of the present invention, the first plastic comprises a post-industrial plastic. In yet another embodiment of the present invention, the first plastic comprises a post-industrial film. In yet another embodiment of the present invention, the first plastic comprises a post-industrial non-woven. In yet another embodiment of the present invention, the post-industrial film is ASPIF. In embodiments of the present invention, the first plastic comprises a post-commercial plastic. In another embodiment of the present invention, the first plastic comprises a post-commercial film. In another embodiment of the present invention, the first plastic comprises a post-commercial non-woven. In yet another embodiment of the present invention, the post-commercial film is ASPCF. In yet another embodiment of the present invention, the first plastic comprises High-Custody post-commercial film. In embodiments of the present invention, the first plastic comprises a post-household plastic. In another embodiment of the present invention, the first plastic comprises a post-household film. In yet another embodiment of the present invention, the first plastic comprises a post-household non-woven.

In embodiments of the present invention, the first plastic comprises polystyrene, co-polystyrene, polyamides, co-polyamides, polycarbonates, thermoplastic elastomers, styrenic block copolymers, polyesters, co-polyesters, polyvinylalcohols, pvcs, and copolymers of any of the above and mixtures of any of the above. In embodiments of the present invention, the first plastic comprises polyolefins, polyolefin copolymers, and polyolefin polar copolymers. In another embodiment of the present invention, the first plastics comprises LDPE and LLDPE copolymers. In another embodiment of the present invention, the first plastic comprises PP. In yet another embodiment of the present invention, the first plastic comprises HDPE and HDPE copolymers. In embodiments of the present invention, the first plastic comprises film, and the film comprises polyethylene and polyethylene copolymers.

The first plastic may be in many forms including but not limited to pellets, micronized pellets, ground pellets, shredded film, shredded or ground injection molded parts, shredded or ground blow molded parts, thermoformed parts, shredded nonwoven or woven, extruded strands, or agglomerated particles. In embodiments of the present invention, the first plastic comprises pellets.

III. Contaminants and Contamination

Contaminants can generally be broken down into two migration categories: 1) permeable; and 2) impermeable. Contaminants that are permeable have solubility and diffusivity in the first plastic to allow migration into, through the plastic, and out of the plastic due to a chemical potential gradient. In other words, permeable contaminants and the grouping called permeable contamination are mobile. Impermeable implies that the contaminant does not have sufficient solubility and diffusivity to significantly move into, through the plastic, and out of the plastic. In other words, impermeable contamination represented by the summation of all impermeable contaminants is essentially immobile.

The chemical contaminants in the first plastic may be numerous but generally fall into one of several relevant chemical classes. Representative classes comprise pesticides, aldehydes, allergic fragrances, izioalines, alkylphenol ethoxylates, alkylphenols, bisphenols, dioxins, dioxin-like, furans, PCBs, organotins, metals, phthalates, polyaromatic hydrocarbons (PAHs), etc. Only some of these chemical classes are routinely found in pre and post-consumer reclaim materials including pesticides, alkylphenol ethoxylates, alkylphenols, bisphenols, dioxins, dioxin-like, furans, PCBs, metals, organotins, phthalates, and PAHs.

Using the analytical methods disclosed in section IX Methods, the LOQs of the various contaminants may differ by orders of magnitude. For example, the LOQ of a typical pesticide is about 10 ppb; the LOQ of typical alkylphenol ethoxylate is about 50 ppb; the LOQ of a typical alkylphenol is about 5 ppb; the LOQ of bisphenol-A is about 5 ppb; the LOQ of typical dioxin is about 0.2 pptr; the LOQ of a typical furan is about 0.2 pptr; the LOQ of a typical PCB is about 5 pptr; the LOQ of a typical heavy metal is about 100 ppb; the LOQ of a typical organotin is about 300 pptr; the LOQ of typical phthalate is 50 ppb; the LOQ of a typical PAH is 1 ppb.

Several films sources were broadly classified for chemical contamination including three ASPIF sources, three High-Custody Post-Commercial Film sources, three Post-Commercial film sources, and one Post-Household film source using the analytical methods disclosed in section IX Methods, as shown in TABLE 1a-1i. Note: To simplify the presentation of chemical contamination results, the concentration data is displayed in terms of LOQ instead of absolute weight fraction. For example, if the contaminant concentration is 10 ppm and the LOQ is 1 ppm, then the concentration would be 10×LOQ or just 10 displayed in the data tables.

Tables 1a-1i

Chemical Contamination of ASPIF, High-Custody Post-Commercial (HCPC), Post-Commercial (PC), and Post-Household (PH) Film Sources TABLE 1a

| | ASPIF | | | HCPC | | | PC | | | PH |
|---|---|---|---|---|---|---|---|---|---|---|
| | #1 | #2 | #3 | #1 | #2 | #3 | #1 | #2 | #3 | #1 |
| Pesticides | xLOQ | | | xLOQ | | | xLOQ | | | xLOQ |
| Pendimethalin | <1 | <1 | <1 | <1 | <1 | <1 | <1 | <1 | <1 | 1.4 |
| Diethyltoluamide (DEET) | <1 | <1 | <1 | <1 | <1 | <1 | <1 | <1 | <1 | 3.7 |
| Piperonyl butoxide | <1 | <1 | <1 | <1 | <1 | <1 | 1.0 | 12.0 | 28.0 | 6.6 |
| Phenylphenol, ortho- | <1 | <1 | <1 | <1 | <1 | <1 | 1.1 | <1 | <1 | <1 |
| Chlorprofam | <1 | <1 | <1 | <1 | <1 | <1 | <1 | <1 | <1 | 1.3 |
| Permethrin | <1 | <1 | <1 | <1 | <1 | <1 | <1 | <1 | <1 | 3.0 |

Pesticide Chemical Contamination

TABLE 1b

Alkyl Phenol Ethoxylates Chemical Contamination

| | ASPIF | | | HCPC | | | PC | | | PH |
|---|---|---|---|---|---|---|---|---|---|---|
| | #1 | #2 | #3 | #1 | #2 | #3 | #1 | #2 | #3 | #1 |
| | | | | | Parameter | | | | | |
| Alkylphenol ethoxylates | xLOQ | | | xLOQ | | | xLOQ | | | xLOQ |
| 4-t-Octylphenolmonoethoxylate | <1 | <1 | <1 | <1 | <1 | <1 | 10.6 | <1 | 4.2 | 9.4 |
| 4-t-Octylphenoldiethoxylate | <1 | <1 | <1 | <1 | <1 | <1 | 5.2 | <1 | 3.6 | 9.0 |
| 4-t-Octylphenoltriethoxylate | <1 | <1 | <1 | <1 | <1 | <1 | 4.2 | <1 | 5.0 | 6.6 |
| 4-t-Octylphenoltetraethoxylate | <1 | <1 | <1 | <1 | <1 | <1 | 4.4 | <1 | 5.6 | 8.4 |
| 4-t-Octylphenolpentaethoxylate | <1 | <1 | <1 | <1 | <1 | <1 | 2.6 | <1 | 6.0 | 11.2 |
| 4-t-Octylphenolhexaethoxylate | <1 | <1 | <1 | <1 | <1 | <1 | 5 | <1 | 6.2 | 17.4 |
| iso-Nonylphenolmonoethoxylate | <1 | <1 | <1 | <1 | <1 | <1 | 2.4 | 1.7 | <1 | 4.0 |
| iso-Nonylphenoldiethoxylate | <1 | <1 | <1 | <1 | <1 | <1 | 2.8 | 8.6 | <1 | 28.0 |
| iso-Nonylphenoltriethoxylate | <1 | <1 | <1 | <1 | <1 | <1 | 3.2 | 6.2 | 5.8 | 32.0 |
| iso-Nonylphenoltetraethoxylate | <1 | <1 | <1 | <1 | <1 | <1 | 1.8 | 4.2 | 6.2 | 22.0 |
| iso-Nonylphenolpentaethoxylate | <1 | <1 | <1 | <1 | <1 | <1 | 2.2 | <1 | 6.2 | 19.2 |
| iso-Nonyl phenol hexaethoxylate | <1 | <1 | <1 | <1 | <1 | <1 | <1 | <1 | <1 | 12.0 |

TABLE 1c

Alkyl Phenols Chemical Contamination

| | ASPIF | | | HCPC | | | PC | | | PH |
|---|---|---|---|---|---|---|---|---|---|---|
| | #1 | #2 | #3 | #1 | #2 | #3 | #1 | #2 | #3 | #1 |
| | | | | | Parameter | | | | | |
| Alkylphenols | xLOQ | | | xLOQ | | | xLOQ | | | xLOQ |
| iso-Nonylphenol | 2.2 | <1 | 320.0 | 190.0 | 120.0 | 86.0 | 920.0 | 168.0 | 260.0 | 300.0 |
| 4-tert-Butylphenol | <1 | <1 | <1 | 3.8 | 1.2 | <1 | 2 | 2.4 | <1 | 6.8 |
| 4-tert-Pentylphenol | <1 | 24.0 | 550.0 | 19.4 | 52.0 | 40.0 | 1660.0 | 3.6 | 116.0 | 1720.0 |

TABLE 1d

Bisphenols Chemical Contamination

| | ASPIF | | | HCPC | | | PC | | | PH |
|---|---|---|---|---|---|---|---|---|---|---|
| | #1 | #2 | #3 | #1 | #2 | #3 | #1 | #2 | #3 | #1 |
| | | | | | Parameter | | | | | |
| Bisphenols | xLOQ | | | xLOQ | | | xLOQ | | | xLOQ |
| Bisphenol A | <1 | <1 | <1 | 46,000.0 | 1800.0 | 114.0 | 4.8 | 320.0 | 760.0 | 144 |

TABLE 1e

Dioxins, Furans, and PCBs Chemical Contamination

| | ASPIF | | | HCPC | | | PC | | | PH |
|---|---|---|---|---|---|---|---|---|---|---|
| | #1 | #2 | #3 | #1 | #2 | #3 | #1 | #2 | #3 | #1 |
| Dioxins and | | | | | Parameter | | | | | |
| dioxinlike and PCB | xLOQ | | | xLOQ | | | xLOQ | | | xLOQ |
| 1,2,3,4,7,8-HxCDD | <1 | <1 | <1 | <1 | <1 | <1 | <1 | <1 | <1 | 1.9 |
| 1,2,3,6,7,8-HxCDD | <1 | <1 | <1 | <1 | <1 | <1 | <1 | <1 | 6.1 | 7.4 |
| 1,2,3,7,8,9-HxCDD | <1 | <1 | <1 | <1 | <1 | <1 | <1 | <1 | 3.8 | 4.5 |
| 1,2,3,4,6,7,8-HpCDD | <1 | <1 | <1 | 2.8 | <1 | 3.4 | 3.8 | 10.9 | 84.5 | 63.0 |

TABLE 1e-continued

Dioxins, Furans, and PCBs Chemical Contamination

| Dioxins and dioxinlike and PCB | ASPIF #1 xLOQ | ASPIF #2 | ASPIF #3 | HCPC #1 xLOQ | HCPC #2 | HCPC #3 | PC #1 xLOQ | PC #2 | PC #3 | PH #1 xLOQ |
|---|---|---|---|---|---|---|---|---|---|---|
| OCDD | <1 | <1 | <1 | 11.1 | 2.6 | 8.9 | 39.6 | 17.2 | 205.0 | 308.5 |
| 2,3,7,8-TCDF | <1 | <1 | <1 | 2.6 | 1.8 | 1.2 | 2.6 | 4.7 | <1 | 16.5 |
| 1,2,3,7,8-PeCDF | <1 | <1 | <1 | <1 | <1 | <1 | <1 | <1 | 2.7 | <1 |
| 2,3,4,7,8-PeCDF | <1 | <1 | <1 | <1 | <1 | <1 | <1 | <1 | <1 | 2.1 |
| 1,2,3,4,7,8-HxCDF | <1 | <1 | <1 | <1 | <1 | <1 | <1 | <1 | 3.3 | 2.0 |
| 1,2,3,6,7,8-HxCDF | <1 | <1 | <1 | <1 | <1 | <1 | <1 | <1 | 2.2 | 1.3 |
| 1,2,3,4,6,7,8-HpCDF | <1 | <1 | <1 | <1 | <1 | <1 | 1.29 | <1 | 7.9 | 6.2 |
| OCDF | <1 | <1 | <1 | <1 | <1 | <1 | 5.45 | <1 | 6.5 | 13.8 |
| PCB 77 | <1 | <1 | <1 | 26.8 | 13.4 | 12.2 | 8.25 | 2.7 | 39.2 | 83.0 |
| PCB 81 | <1 | <1 | <1 | 46.4 | 19.9 | 21.8 | 10.58 | 5.6 | 88.2 | 79.4 |
| PCB 126 | <1 | <1 | <1 | 11 | 6.3 | 13.3 | 19.1 | 2.9 | 65.2 | 128.8 |
| PCB 169 | <1 | <1 | <1 | <1 | <1 | <1 | <1 | <1 | <1 | 11.2 |
| PCB 105 | <1 | <1 | <1 | 24.6 | 9.9 | 9.2 | 35.2 | 19.8 | 157.2 | 116.4 |
| PCB 114 | <1 | <1 | <1 | 1.9 | <1 | <1 | 2.22 | 1.3 | 10.5 | 7.1 |
| PCB 118 | <1 | <1 | <1 | 50.7 | 14.5 | 14.3 | 45.7 | 28.5 | 227.0 | 15.1 |
| PCB 123 | <1 | <1 | <1 | 4.9 | 1.8 | 2 | 4.46 | 6.6 | 23.8 | 28.0 |
| PCB 156 | <1 | <1 | <1 | 5.7 | 2.8 | <1 | 3.52 | 4.9 | 24.2 | 22.4 |
| PCB 157 | <1 | <1 | <1 | <1 | <1 | <1 | <1 | <1 | 5.0 | <1 |
| PCB 167 | <1 | <1 | <1 | 3.1 | 1.3 | <1 | <1 | 2.6 | 13.7 | 7.9 |
| PCB 189 | <1 | <1 | <1 | <1 | <1 | <1 | <1 | <1 | 1.3 | <1 |

TABLE 1f

Heavy Metals Chemical Contamination

| Elements | ASPIF #1 xLOQ | ASPIF #2 | ASPIF #3 | HCPC #1 xLOQ | HCPC #2 | HCPC #3 | PC #1 xLOQ | PC #2 | PC #3 | PH #1 xLOQ |
|---|---|---|---|---|---|---|---|---|---|---|
| Aluminium | 7.6 | <1 | 88.0 | 99.0 | 76.0 | dnt | dnt | dnt | 349 | 503.0 |
| Antimony | <1 | <1 | <1 | <1 | <1 | dnt | dnt | dnt | 2.0 | 9.0 |
| Arsenic | <1 | 9.0 | <1 | <1 | <1 | dnt | dnt | dnt | <1 | 1.0 |
| Barium | <1 | <1 | 2.8 | <1 | <1 | dnt | dnt | dnt | 4.8 | 288.0 |
| Bismuth | <1 | 295 | <1 | <1 | <1 | dnt | dnt | dnt | <1 | 1.0 |
| Lead | <1 | <1 | <1 | <1 | <1 | dnt | dnt | dnt | 3.0 | 140.0 |
| Boron | <1 | 3 | <1 | <1 | <1 | dnt | dnt | dnt | 4.4 | 1.4 |
| Calcium | 6.2 | 12.0 | 794.0 | 6.2 | 2.6 | dnt | dnt | dnt | 56.0 | 690.0 |
| Cerium | <1 | <1 | <1 | <1 | <1 | dnt | dnt | Dnt | 2.0 | 3.0 |
| Chromium | <1 | <1 | 7.0 | <1 | <1 | dnt | dnt | dnt | 7.0 | 45.0 |
| Cobalt | <1 | <1 | <1 | <1 | <1 | dnt | dnt | dnt | 5.0 | 1.0 |
| Iron | <1 | <1 | 45.0 | 9.3 | 3.4 | dnt | dnt | dnt | 77.0 | 160.0 |
| Gallium | <1 | <1 | <1 | <1 | <1 | dnt | dnt | dnt | <1 | 1.0 |
| Germanium | <1 | 3.0 | <1 | <1 | <1 | dnt | dnt | dnt | <1 | <1 |
| Iridium | <1 | 126.0 | <1 | <1 | <1 | dnt | dnt | dnt | <1 | <1 |
| Potassium | <1 | 2.0 | <1 | <1 | 1 | dnt | dnt | dnt | 2.1 | 7.2 |
| Copper | <1 | 1.0 | 4.0 | 4.0 | <1 | dnt | dnt | dnt | 9.0 | 360.0 |
| Lithium | <1 | 568.0 | <1 | <1 | <1 | dnt | dnt | dnt | 3.0 | 3.0 |
| Magnesium | 32.0 | <1 | 226.0 | 64.0 | 26.0 | dnt | dnt | dnt | 154.0 | 1172.0 |
| Manganese | <1 | 11.1 | 8.0 | <1 | 1 | dnt | dnt | dnt | 10.0 | 35.0 |
| Molybdenum | <1 | <1 | <1 | <1 | <1 | dnt | dnt | dnt | <1 | 22.0 |
| Sodium | <1 | <1 | 222.0 | 74.0 | 72.0 | dnt | dnt | dnt | 132.0 | 358.0 |
| Nickel | <1 | <1 | <1 | <1 | <1 | dnt | dnt | dnt | 4.0 | 6.0 |
| Phosphorus | 3.9 | <1 | 5.9 | 4.0 | 3.9 | dnt | dnt | dnt | 2.2 | 6.2 |
| Rubidium | <1 | 3.4 | <1 | <1 | <1 | dnt | dnt | dnt | <1 | <1 |
| Ruthenium | <1 | 2.0 | <1 | <1 | <1 | dnt | dnt | dnt | <1 | <1 |
| Strontium | <1 | 8.2 | 8.4 | <1 | <1 | dnt | dnt | dnt | 2.2 | 17.2 |
| Titanium | 4.0 | <1 | 36.0 | 4.4 | 3 | dnt | dnt | dnt | 80.0 | 7900.0 |
| Uranium | <1 | 240 | <1 | <1 | <1 | dnt | dnt | dnt | <1 | <1 |
| Tungsten | <1 | 41 | <1 | <1 | <1 | dnt | dnt | dnt | <1 | 6.0 |
| Yttrium | <1 | <1 | <1 | <1 | <1 | dnt | dnt | dnt | <1 | 3.0 |
| Zinc | 2.0 | 240.0 | 2470.0 | 100.0 | 2920.0 | dnt | dnt | dnt | 3150 | 890.0 |
| Tin | <1 | <1 | <1 | <1 | <1 | dnt | dnt | dnt | <1 | 8.0 |
| Zirconium | <1 | 41.0 | 1.0 | <1 | 2.0 | dnt | dnt | dnt | 4.0 | 48.0 |

TABLE 1g

Organotins Chemical Contamination

| Organotin compounds | ASPIF #1 | ASPIF #2 | ASPIF #3 | HCPC #1 | HCPC #2 | HCPC #3 | PC #1 | PC #2 | PC #3 | PH #1 |
|---|---|---|---|---|---|---|---|---|---|---|
| | xLOQ | | | xLOQ | | | xLOQ | | | xLOQ |
| Monomethyltin | 2.0 | <1 | <1 | <1 | <1 | dnt | dnt | <1 | dnt | <1 |
| Dimethyltin | <1 | <1 | <1 | 4.0 | <1 | dnt | dnt | <1 | dnt | 5.0 |
| Monobutyltin | <1 | <1 | <1 | 4.0 | 5.0 | dnt | dnt | 2.3 | dnt | 3.0 |
| Dibutyltin | 1.7 | <1 | <1 | 1.3 | <1 | dnt | dnt | 20.7 | dnt | 11.7 |
| Tributyltin | <1 | <1 | <1 | <1 | <1 | dnt | dnt | <1 | dnt | 3.0 |
| Dioctyltin | <1 | <1 | <1 | 45.0 | <1 | dnt | dnt | <1 | dnt | 2.0 |

TABLE 1h

Phthalates Chemical Contamination

| Phthalates | ASPIF #1 | ASPIF #2 | ASPIF #3 | HCPC #1 | HCPC #2 | HCPC #3 | PC #1 | PC #2 | PC #3 | PH #1 |
|---|---|---|---|---|---|---|---|---|---|---|
| | xLOQ | | | xLOQ | | | xLOQ | | | xLOQ |
| Di-2-propylheptyl phthalate | <1 | <1 | <1 | <1 | <1 | 1.2 | <1 | 1.7 | 1.2 | 14.6 |
| Diethyl phthalate | <1 | <1 | <1 | <1 | <1 | <1 | <1 | <1 | <1 | 4.6 |
| Diisobutyl phthalate | <1 | <1 | <1 | 24 | 9.6 | 1.3 | 12.6 | 6.2 | 6.6 | 22.0 |
| Dibutyl phthalate | <1 | <1 | <1 | 26 | 10.8 | 8.4 | 4.6 | 9.2 | 22.0 | 32.0 |
| Dimethoxyethyl phthalate | <1 | <1 | <1 | <1 | <1 | <1 | <1 | <1 | 1.7 | <1 |
| Benzylbutyl phthalate | <1 | <1 | <1 | <1 | <1 | <1 | <1 | <1 | 2.6 | 10.4 |
| Di-2-ethylhexyl phthalate | <1 | <1 | <1 | 12.8 | 8.4 | 3.0 | 12.6 | 15.4 | 17.8 | 700.0 |
| Diisononyl phthalate | <1 | <1 | <1 | <1 | <1 | <1 | 24 | 20.0 | 26.0 | 240.0 |

TABLE 1i

PAHs Chemical Contamination

| PAHs | ASPIF #1 | ASPIF #2 | ASPIF #3 | HCPC #1 | HCPC #2 | HCPC #3 | PC #1 | PC #2 | PC #3 | PH #1 |
|---|---|---|---|---|---|---|---|---|---|---|
| | xLOQ | | | xLOQ | | | xLOQ | | | xLOQ |
| Acenaphthene | <1 | <1 | <1 | 10 | 5.6 | 3.8 | 4.1 | 9.7 | 1.8 | 22.0 |
| Acenaphthylene | <1 | <1 | <1 | <1.0 | <1 | <1 | <1 | 8.2 | <1 | <1 |
| Anthracene | <1 | <1 | <1 | 1.9 | 1.4 | 2.7 | <1 | 11.0 | 7.1 | 6.8 |
| Benzo[a]anthracene | <1 | <1 | <1 | <1.0 | <1 | <1 | <1 | 2.4 | 2.1 | 6.6 |
| Benzo[a]pyrene | <1 | <1 | <1 | <1.0 | <1 | <1 | <1 | <1 | <1 | 5.1 |
| Benzo[b]fluoranthene | <1 | <1 | <1 | <1.0 | <1 | <1 | <1 | 1.3 | 1.5 | 6.3 |
| Benzo[c]fluorene | <1 | <1 | <1 | <1.0 | <1 | <1 | <1 | <1 | <1 | 1.8 |
| Benzo[e]pyrene | <1 | <1 | <1 | <1.0 | <1 | <1 | <1 | 1.4 | 1.7 | 6.5 |
| Benzo[g,h,i]perylene | <1 | <1 | <1 | <1.0 | <1 | <1 | <1 | 1.4 | 1.7 | 12.0 |
| Benzo[j]fluoranthene | <1 | <1 | <1 | <1.0 | <1 | <1 | <1 | <1 | 1.2 | 2.9 |
| Benzo[k]fluoranthene | <1 | <1 | <1 | <1.0 | <1 | <1 | <1 | <1 | <1 | 2.4 |
| Chrysene | <1 | <1 | <1 | <1.0 | <1 | <1 | <1 | 2.9 | 3.8 | 8.5 |
| Fluoranthene | <1 | <1 | <1 | 33.0 | 11.0 | 7.9 | 8.3 | 46.0 | 63.0 | 44.0 |
| Fluorene | 1.5 | <1 | <1 | 18.0 | 8.5 | 7.6 | 7 | 21.0 | 2.7 | 20.0 |
| Indeno[1,2,3-c,d]pyrene | <1 | <1 | <1 | <1.0 | <1 | <1 | <1 | <1 | <1 | 4.1 |
| Naphthalene | 2.4 | <1 | <1 | 6.0 | <1 | 5.3 | 2.8 | 14.0 | <1 | 5.7 |
| Phenanthrene | 5.2 | <1 | <1 | 59.0 | 27.0 | 28.0 | 18.0 | 120.0 | 62.0 | 100.0 |
| Pyrene | <1 | <1 | <1 | 29.0 | 13.0 | 9.2 | 9.9 | 33.0 | 59.0 | 57.0 |

The tested ASPIF sources were primarily absent detectable levels of chemical contaminants except for alkylphenols and heavy metals and small amounts of organotins and PAHs. Heavy metals were not included in ongoing analysis due to their limited ability to migrate from the reclaimed source. The tested High-Custody Post-Commercial film sources were largely free of pesticides and alkylphenol ethoxylates, but contained detectable levels of alkylphenols, bisphenol-A, dioxins/furans/PCBs, and PAHs and low levels of phthalates. The tested Post-Commercial Film sources were heavily contaminated with every class evaluated.

From TABLES 1a-1i, representative chemical species were selected from the various classes based upon prevalence across the spectrum of reclaim sources. The selected representative chemical species within these classes include: piperonyl butoxide (representing pesticides); 4-t-octylphenolhexaethoxylate and iso-nonylphenoltriethoxylate (representing alkylphenolethoxylates); iso-nonylphenol and 4-tert-pentylphenol (representing alkylphenols); bisphenol-A (representing phenols); 1.2.3.6.7.8-HxCDD, 1.2.3.4.6.7.8-HpCDD, and OCDD (representing dioxins); OCDF (representing furans); PCB 105 and PCB 118 (representing PCBs); monobutyltin and dibutyltin (representing organotins); dibutyl phthalate and di-2-ethylhexyl phthalate (representing phthalates); and fluoranthene and phenanthrene (representing polycyclicaromatic hydrocarbons (PAHs).

In embodiments of the present invention, said chemical contaminants in said first plastic include at least one chemical contaminant and such is selected from the group comprising pesticides, alkyl phenols, alkylphenol ethoxylates, bisphenols, dioxins, furans, PCBs, phthalates, PAHs or mixtures thereof.

In embodiments of the present invention, the contaminants in the first plastic may comprise 4-tert-pentylphenol. In embodiments of the present invention, the contaminants in the first plastic may comprise bisphenol-A. In embodiments of the present invention, the contaminants in the first plastic may comprise OCDD. In embodiments of the present invention, the contaminants in the first plastic may comprise PCB 118. In embodiments of the present invention, the contaminants in the first plastic may comprise di-2-ethylhexyl phthalate.

In order to simplify the analysis of the purification results for objects of the present invention and associated examples, the number of chemical species presented per chemical class is limited to the aforementioned representative chemical species for each chemical class as shown in Table 2 along with the associated LOQ and the respective levels for the tested ASPIF sources. Note: Even though more in-depth and complete chemical analysis was completed for all objects of the present invention, only the representative chemicals are shown ongoing. This simplification does not impact or alter the inventive matter or conclusions reached from such.

TABLE 2

Simplified Chemical Contaminants and Associated LOQ Concentrations

| Parameter | LOQ |
|---|---|
| Pesticides | |
| Piperonyl butoxide | 10 ppb |
| Alkylphenol ethoxylates | |
| 4-t-Octylphenolhexaethoxylate | 5 ppb |
| iso-Nonylphenoltriethoxylate | 50 ppb |
| Alkylphenols | |
| iso-Nonylphenol | 50 ppb |
| 4-tert-Pentylphenol | 5 ppb |
| Bisphenols | |
| Bisphenol A | 5 ppb |
| Dioxins and dioxinlike and PCB | |
| 1,2,3,4,6,7,8-HpCDD | 0.2 pptr |
| OCDD | 0.2 pptr |
| OCDF | 0.2 pptr |
| PCB 105 | 5 pptr |
| PCB 118 | 10 pptr |
| Organotin compounds | |
| Monobutyltin | 300 pptr |
| Dibutyltin | 300 pptr |
| Phthalates | |
| Dibutyl phthalate | 50 ppb |
| Di-2-ethylhexyl phthalate | 50 ppb |
| Polycyclic aromatic hydrocarbons (PAH) | |
| Fluoranthene | 1 ppb |
| Phenanthrene | 1 ppb |

In embodiments of the present invention, the concentration of each pesticide in the purer plastic is lower than its respective LOQ; wherein the first plastic has at least one detectable pesticide. In embodiments of the present invention, the concentration of bis-phenol A in the purer plastic is lower than its respective LOQ; wherein the first plastic has at least detectable bis-phenol A. In embodiments of the present invention, the concentration of each dioxin in the purer plastic is lower than its respective LOQ; wherein the first plastic has at least one detectable dioxin. In embodiments of the present invention, the concentration of each PCB in the purer plastic is lower than its respective LOQ; wherein the first plastic has at least one detectable PCB. In embodiments of the present invention, the concentration of each phthalate in the purer plastic is lower than its respective LOQ; wherein the first plastic has at least one detectable phthalate.

In embodiments of the present invention, the concentration of piperonyl butoxide in said purer plastic is less than about 10 ppb; wherein said first plastic has a concentration of piperonyl butoxide above 10 ppb; the concentration of 4-tert-Pentylphenol in said purer plastic is less than about 5 ppb; wherein said first plastic has a concentration of 4-tert-pentylphenol is above 5 ppb; the concentration of bisphenol-A in said purer plastic is less than about 5 ppb; wherein said first plastic has a concentration of bisphenol-A is above 5 ppb; the concentration of OCDD in said purer plastic is less than about 0.2 pptt; wherein said first plastic has a concentration of OCDD above pptr; the concentration of PCB 118 in said purer plastic is less than about 10 pptr; wherein said first plastic has a concentration of PCB 118 above 10 pptr; and the concentration of di-2-ethylhexyl phthalate in said purer plastic is less than about 50 ppb;

wherein said first plastic has a concentration of di-2-ethylhexyl phthalate above 50 ppb.

In general, the efficacy of a cleaning process to remove a specific chemical contaminant is determined by the removal efficiency, defined as the difference in concentration of the chemical contaminant in the first plastic and the concentration of the chemical contaminant in the purer plastic divided by the concentration of the chemical contaminant in first plastic expressed as a percentage. However, the removal efficiency is somewhat insufficient due to the inability to determine concentrations below the LOQ. For example, if a cleaning process reduces the contamination from 2×LOQ to less than the LOQ, then the removal efficiency could be anywhere between 50% and 100%, which is a significant difference. Thus, the removal efficiency is only sufficient when the first plastic and purer plastic chemical contaminant concentration are both above LOQ. For simplicity, if the purer plastic has a chemical contaminant concentration below LOQ, then removal efficiency is calculated by assuming the chemical contaminant concentration of the purer plastic is at the LOQ and the removal efficiency is considered a minimum value and designated with >. For the above example, the removal efficiency would be calculated as 100(2×LOQ−1×LOQ)/(2×LOQ)=100(2−1)/2=50%. Thus, the removal efficiency would be >50%. In certain cases, the purer plastic will have a higher level of a contaminant than the first plastic due to 1) measurement error, 2) contaminant hot spots and cold spots in the first plastic, 3) external contamination during sampling, and 4) the purification process adds contamination. In such cases, the removal efficiency is set to 0% to not bias the average results. If such occurs consistently for a given cleaning process, then such is more likely attributable to the purification process and should be more closely examined, but such was not generally the case for the cleaning processes of the present invention.

In one embodiment of the present invention, the removal efficiency of the piperonyl butoxide contaminant is >55% wherein said piperonyl butoxide concentration in the first plastic is at least 10 parts per billion. In still yet another embodiment of the present invention, the removal efficiency of the piperonyl butoxide contaminant is >96% wherein said piperonyl butoxide concentration in the first plastic is at least about 10 parts per billion.

In embodiments of the present invention, the removal efficiency of the Iso-nonylphenoltriethoxylate contaminant is >55% wherein said Iso-nonylphenoltriethoxylate concentration in the first plastic is at least 50 parts per billion. In another embodiment of the present invention, the removal efficiency of the Iso-nonylphenoltriethoxylate contaminant is >97% wherein said Iso-nonylphenoltriethoxylate concentration in the first plastic is at least 50 parts per billion.

In embodiments of the present invention, the removal efficiency of the 4-tert-pentylphenol contaminant is >55% wherein said 4-tert-pentylphenol concentration in the first plastic is at least parts per billion. In yet another embodiment of the present invention, the removal efficiency of the 4-tert-pentylphenol contaminant is >99% wherein said 4-tert-pentylphenol concentration in the first plastic is at least 5 parts per billion.

In embodiments of the present invention, the removal efficiency of the bisphenol A contaminant is >55% wherein said bisphenol A concentration in the first plastic is at least 5 parts per billion. In another embodiment of the present invention, the removal efficiency of the bisphenol A contaminant is >99% wherein said bisphenol A concentration in the first plastic is at least 5 parts per billion.

In embodiments of the present invention, the removal efficiency of the OCDD contaminant is >55% wherein said OCDD concentration in the first plastic is at least about 0.2 parts per trillion. In another embodiment of the present invention, the removal efficiency of the OCDD contaminant is >99% wherein said OCDD concentration in the first plastic is at least about 0.2 parts per trillion.

In embodiments of the present invention, the removal efficiency of the OCDF contaminant is >55% wherein said OCDF concentration in the first plastic is at least about 0.2 parts per trillion.

In another embodiment of the present invention, the removal efficiency of the OCDF contaminant is >90% wherein said OCDF concentration in the first plastic is at least about 0.2 parts per trillion.

In embodiments of the present invention, the removal efficiency of the PCB 118 contaminant is >55% wherein said PCB 118 concentration in the first plastic is at least 10 parts per trillion. In another embodiment of the present invention, the removal efficiency of the PCB 118 contaminant is >99% wherein said PCB 118 concentration in the first plastic is at least about parts per trillion.

In embodiments of the present invention, the removal efficiency of the Di-2-ethylhexyl phthalate contaminant is >55% wherein said Di-2-ethylhexyl phthalate concentration in the first plastic is at least about 50 parts per billion. In another embodiment of the present invention, the removal efficiency of the Di-2-ethylhexyl phthalate contaminant is >90% wherein said Di-2-ethylhexyl phthalate concentration in the first plastic is at least about 50 parts per billion.

In embodiments of the present invention, the removal efficiency of the Phenanthrene contaminant is >55% wherein said Phenanthrene concentration in the first plastic is at least 1 part per billion. In another embodiment of the present invention, the removal efficiency of the Phenanthrene contaminant is >90% wherein said Phenanthrene concentration in the first plastic is at least 1 part per billion.

Contamination can be located on the surface of the plastic or in the bulk. Contamination on the surface is most readily and easily removed by surface cleaning technologies available on the market today. If the surface contamination is permeable in the plastic, then it will become bulk contamination over time through diffusion mechanisms, thus complicating reduction and limit the effectiveness of surface cleaning technologies. If the surface contamination is impermeable in the plastic, then such contamination will not diffuse into the bulk and will be reduced by simple surface cleaning methods, such as aqueous washing. Bulk contamination of either permeable or impermeable type typically cannot be effectively removed via simple surface purification methods, such as aqueous washing. Bulk contamination of the impermeable type (also known as bulk impermeable contamination) is trapped in the bulk plastic and may be freed through mechanisms comprising melt convection, melt filtration, or dissolution/disintegration of the bulk plastic.

As discussed previously, contamination can be introduced externally throughout the lifecycle of the plastic. If the contamination is impermeable, then such contamination will largely remain on the surface during the plastic lifecycle up to the point of reclaiming. If the contamination is permeable, then over time, the contamination will migrate into the bulk plastic. Thus, absent a contamination or purification event, the contamination will remain essentially constant, but the balance of surface to bulk contamination will change with time but will approach equilibrium at long time. In general, loosely bound surface contamination such as dirt may be in the 0.01 to about 0.1 wt %; whereas the chemical contamination, especially the chemical contaminants of concern for this invention, will be ppm, ppb, or even pptrillion.

Permeable and impermeable contamination represents different challenges in the demanding applications. For instance, permeable contamination whether in the bulk plastic or on the surface of the plastic will have the potential to migrate to uncontaminated materials, such as a product or to human skin. However, if the contaminant is impermeable and in the bulk of the plastic, then it will have low ability to transfer to the product or to the user's skin unless the bulk plastic is disintegrated or ingested. If the contaminant is impermeable and on the surface of the plastic, then such contamination would have the ability to transfer to the product or skin by direct contact transfer. Surface contamination, both permeable and impermeable, can be transformed into bulk contamination through convective mechanism, such as melt mixing and melt densification. These methods exchange or eliminate surface area with bulk material. For example, if surface contaminated film is melt-densified or melt extruded into a different shape, such as a pellet, then all original surface contamination will become bulk contamination whether such is impermeable or not and such bulk contamination will be more difficult to remove with purification processes. Melt densification is common in the recycle industry. It is also common in the recycle industry to shred incoming plastics. The latter methods generally do not convert surface contamination to bulk contamination. Ideally, surface purification methods, such as surface washing, take place on the original contaminated surface such as shredded film wherein all original surface area is reachable by the surface washing fluid.

In general, surface contamination and bulk contamination are difficult to differentiate using analytical methods. Most analytical methods for permeable chemical contaminants involve solvent extraction of the contaminant from the plastic over extended periods of time >6 hours and with exposure to extreme solvent to plastic mass ratios >100:1 and then quantifying the contaminant in the solvent using methods, such as Gas Chromatography—Mass Spectrometry (GC-MS). Such analytical methods quantify contamination but do not differentiate surface from bulk contaminants. The efficiency of a purification method to remove surface contamination can be estimated from the difference in contamination before and after the surface cleaning step but such assumes bulk contamination is not significant impacted, which is likely the case for surface washing with aqueous surface washing fluids discussed in the current invention. A more accurate way to quantify surface contamination is through washing and then solvent extraction of the contaminant at various times and then extrapolating the amount of the contaminant removed at infinitesimal time, which will approximate the amount of surface contamination. However, this method is time consuming and costly especially for contaminants that are difficult to measure in general. In addition, since the balance of surface and bulk contaminants are dynamic, it is difficult to quantify without referencing an exact sampling time. A simple method for quantifying general surface contamination (not chemical surface contamination or species based chemical contaminants) is weighing the first plastic before and after the surface washing step.

In general, bulk contamination will not be appreciably removed by simple aqueous surface washing. Permeable bulk contamination can be removed by diffusion mechanisms through gradients in chemical potential. Whereas bulk impermeable contamination is essentially trapped by the bulk polymer and methods to free the trapped contaminant comprise melt convection, melt filtration, and dissolution/disintegration of the plastic.

IV. Surface Purification Methods

Surface purification methods reduce surface contamination. One such method is surface washing with a surface washing fluid that is typically water based. Surface washing is ideally completed before any melt mixing or melt densification to allow effective cleaning of the original contaminated surface. The first plastic will generally be in the form of pellets, loose or compacted film, loose or compacted flexible packages, loose or compacted rigids, loose or compacted non-wovens, etc. which will be difficult to surface wash due to excessive overall size. Hence, prior to surface washing, a granulation or shredding step is preferred. For films, it is especially important to exfoliate all available film layers, such that the washing fluid can access all original surface contamination. Thus, the size reduction step prior to surface washing should not significantly decrease the surface area to volume ratio of the reclaimed source or exchange such with new surface area. In embodiments of the present invention, said surface washing of said first plastic is conducted after a shredding or granulation step. In embodiments of the present invention, said surface area to volume ratio of the reclaimed source is preferably above about 1 mm-1, more preferably above about 5 mm-1, even more preferably above about 20 mm-1, and most preferably above about 50 mm-1. The surface washing will include significant mechanical agitation to loosen surface dirt and other contaminants to allow physical removal and transfer to the washing fluid wherein the dirt or other contaminants may or may not solubilize. As used herein, a surface washing method is any method wherein the reclaimed plastic in its original contaminated form (except for the possibility of bulk size reduction that does not eliminate more than 25% of the original surface) is contacted with an aqueous solution under mechanical agitation and then separated from the aqueous media which now contains such contamination. Such a method will in general remove the majority of loosely bound surface contamination including but not limited to dirt, wood, loosely bound paper, and some surface chemical contamination. Typical levels of loosely bound surface contamination for film based reclaimed sources are between about 0.01 and 0.1 wt %. For objects of the present invention involving a surface washed first plastic, the surface washing process will remove greater than about 80% of the loosely bound surface contamination as determined by method 2 shown in section IX.

Surface washing technologies are available extensively on the market. One representative technology is from Lindner (Lindner Washtech GmbH, Häldenfeld 4, Germany). The technology is described in detail elsewhere (https://www.lindner-washtech.com/system-solutions) but involves water washing under vigorous mechanical agitation and the potential for application of caustic to remove adhesives followed by drying and pelletization.

Another representative surface washing technology is from Herbold (Herbold Meckesheim USA, North Smithfield, RI). The technology is described in detail elsewhere (https://www.herbold.com/en/machines/washing-separating-drying-2/) but also involves various water washing steps under vigorous mechanical agitation followed by drying and pelletization.

Another representative technology is from Sorema (Sorema S.r.l., Anzano del Parco, Italy). The technology is described in detail elsewhere (http://soremalt/en_US/applications/washing-line/) but involves similar aqueous operations relative to Lindner and Herbold.

Another representative surface washing technology is from Cadel called De-inking (Cadel Deinking, Alicante, Spain). The technology is described elsewhere (http://cadel-deinking.com/en/) but essentially involves the surface washing of materials using high temperature aqueous based solutions with specific surfactants, followed by water rinsing and drying. The process optional may include densification, melt filtration, de-volatilization, and pelletization following the surface washing. This method differs from other known methods in that it claims to remove surface printed inks. Such would be advantageous due to lowering the burden for chemical contaminant removal by the bulk purification methods of the current invention.

Three surface washing technologies of the prior art were evaluated for removal of the targeted classes of chemical contaminants (Comparative Examples 1, 2, and 3). Each of the surface washing technologies was evaluated using a different reclaimed film input with different levels of contamination. Overall, the surface washing technologies of the prior art were not able to purify the reclaimed materials sufficiently for use in controlled end markets. For the targeted contaminants, the commercial technologies were not able to reduce to levels near the LOQ despite low initial contamination of the respective reclaimed sources. In addition, the average removal efficiency for 4-tert-pentylphenol, bisphenol A, OCDD, PCB 118, di-2-ethylhexyl phthalate was less than about 55%.

V. Melt Densification

The plastic coming out of the surface purification step will generally be in a similar geometric form and with similar surface area to volume ratio as the incoming reclaimed plastic, assuming the surface purification temperature was less than the primary melting point of the first plastic. For example, if the reclaimed plastic is loose film, then after shredding and surface washing at a temperature below the primary melting point of the first plastic, the film will exit surface purification as a shredded film. Because such loose plastic is difficult to feed to certain bulk purification methods such as liquid-liquid extraction, it may be desirable to melt densify such plastic prior to bulk purification. A preferred method for melt densification is melt extrusion. The melt extrusion not only densifies the plastic, but it may provide the pressure necessary for the downstream bulk purifications like liquid-liquid extraction. The melt extrusion may also include optional steps, such as melt filtration, and/or devolatilization to remove large bulk contaminants and/or volatile bulk contaminants. In addition, the molten densified plastic may be further pressurized using a melt pump. The melt pump may be necessary to increase the pressure necessary for the downstream bulk purification step. Other methods of densification are known in the art including rotating disc and rotating drum densifiers, which occur at lower temperatures relative to melt based methods.

In embodiments of the present invention, said melt densification comprises melt extrusion. In another embodiment of the present invention, said melt extrusion comprises melt filtration. In yet another embodiment of the present invention, said melt extrusion comprises melt devolatilization. In even yet another embodiment of the present invention, said melt extrusion comprises melt pumping. In embodiments of the present invention, said melt densification comprises melt extrusion, melt filtration, melt devolatilization, and melt pumping.

VI. Bulk Purification

In general, bulk contamination will not be appreciably reduced by simple aqueous surface washing. Melt filtration and melt devolatilization will have the potential to remove bulk contaminants of large geometric size and remove some volatile bulk contaminants but will be largely ineffective against most bulk contaminants especially to the required levels.

One technology available on the market to complete bulk purification is InterRema Refresher™ from EREMA (EREMA Group, Ansfelden, Austria) https://www.erema-.comien/refresher/). The technology is described in detail elsewhere but essentially consists of devolatilization of pelletized materials over extended periods of time at temperatures below the primary melting point of the plastic to remove volatile organics. Most of the chemical contaminants relevant to reclaimed materials and discussed in the prior sections are highly non-volatile with normal boiling points typically above 200C. Hence, this type of devolatilization technology will have limited ability to remove most chemical contamination referenced in this application.

Other technologies based upon devolatilization are common. These may be stand-alone unit operations or combined with other operations including extrusion and melt filtration. Those utilizing sub-ambient pressure over a molten stream of the reclaimed plastic are common.

One bulk purification technology involving devolatilization was analyzed for purification capability. The technology involved slightly elevated temperatures but below the primary melting point of the plastic, long residence times (>about 2 hours), and continuous reflux of purified air to provide the devolatilization (as shown below in Comparative Example 4). The commercial devolatilization technology was unable to sufficiently remove the targeted contaminants. For example, the targeted contaminants were still well above LOQ. In addition, the average removal efficiency was ~20%.

Extraction is a preferred bulk purification method. Extraction involves the use of a purification solvent to remove bulk permeable contaminants through creation of a chemical potential gradient between the first plastic and the solvent. The rate of permeable chemical contaminant removal will depend upon the diffusivity and solubility of the contaminant in the plastic under the conditions created in the process. For high molecular weight plastics, the diffusivity of large molecules indicative of chemical contaminants is quite low, especially in the solid state of the plastic. In addition, the solubility may be limited due to the high MW of the first plastic and lack of enthalpic mixing. Thus, the time required to remove permeable contaminants through diffusion mechanisms can be quite long and not conducive to economically viable processes at commercial scale. Methods to resolve these time scale limitations include 1). increased diffusivity through elevated temperature and/or plastic relaxation through solvent swelling, 2). decrease of diffusion path length through increased surface area to volume ratio of the first plastic exposed to the solvent, 3) increased convective transport of the contaminant through the plastic/solvent interface by: increased solubility of the contaminant in the solvent, increased partitioning of the contaminant within the solvent relative to the plastic; increased convection around the plastic/solvent interface, and increased solvent sink relative to plastic sink. The solubility of the bulk purification solvent in the plastic can be increased by operating the extraction at high pressures especially at, near, or above the critical pressure.

It is important for the extraction method to be scalable to large volumes at low cost. Hence, the time required for extraction should be low to allow for such scalability. In embodiments of the present invention, the total time for extraction is less than about 6 hours, preferably less than about 4 hours, more preferably less than about 2 hours, and even more preferably less than about 1 hour. If the extraction is completed in stages, then the time per stage may be less than this range but the overall time will still fall within these times.

Extractions may take place above, near, at, or below the primary melting point of the first plastic. Extraction taking place at, near, or above the primary melting point of the first plastic are called liquid-liquid extractions. Extractions taking place below the primary melting point of the first plastic are called packed leaching extractions. Extraction solvents used in packed leaching extractions are called packed leaching solvents.

In packed leaching processes of the current invention, the first plastic is in a packed form and the solvent volume in contact with the first plastic at any point in time is either sufficient to fill or under fill the void volume. For the purposes of the invention, such packed leaching processes are termed packed leaching processes. For loosely packed shredded film, the void volume % may be as high as about 90% but once contacted by packed leaching solvent, the void volume typically drops to less than about 83%. Thus, a maximum of about 5 volumes of solvent will be able to fill about 1 volume of packed shredded film. Since most solvents of interest in the current invention have density lower than the reclaimed plastics, the maximum mass ratio of solvent that is able to completely fill a loosely packed shredded film will be less than 5:1. Since shredded film tends to have the lowest bulk density of the reclaimed materials, the mass of solvent to mass of first plastic required to fill the packed volume is less than about 5:1. Hence, for objects of the current invention involving packed leaching extractions, the mass ratio of solvent in contact with the first plastic at any point in time and within any stage is preferably less than about 5:1. Such packed leaching processes may either be percolation type or immersion type and such packed leaching processes are common in the edible oils industry but are uncommon in the plastic industry. In percolation type packed leaching processes, the solvent volume in contact with the material to be extracted at any point in time within any stage is less than the void volume in the material to be extracted. The packed leaching solvent is continuously dripped through the packed material in a series of stages. The material may be moved continuously through the packed leaching process from stage to stage. Commercial examples of such percolation based packed leaching processes include the Rotocel, Carousel, and Loop extractors, which are commonly used for extracting various oils from biological sources. In the immersion type packed leaching process, the solvent volume in contact with the material to be extracted at any point in time and at any stage is equal to or greater than the void volume in the packed material. In immersion packed leaching processes, the material to be extracted is either held in place while solvent is flowed through such as a packed bed or the material is conveyed using mechanical means such as conveying screws such as solids state extrusion or belts. Examples of solid-state extrusion are commercial processes such as those offered by PureVision Technologies wherein solvent is flowed counter-currently to the flow of extracting solids (http://www.purevisiontechnology.com/about/). Further examples of screw type systems are the Hildebrandt reactor. A further example of immersion packed leaching processes is the Model IV Extractor Crown Iron Works Company.

The packing of the first plastic should be sufficient to prevent excessive tumbling or agitation, but not so high as to eliminate surface area for mass transfer.

Specific to packed leaching, the use of packed leaching solvents that excessively swell and hence, soften the first plastic may be problematic due to agglomeration. In such cases, the packed leaching temperature may need to be further lowered to avoid the agglomeration. The use of oxygenated and/or polar packed leaching solvents may not have this issue due to a lack of significant swelling or softening of the first plastic. Unlike liquid-liquid where phase stability may be problematic with oxygenated or polar packed leaching solvents, the use of oxygenated or polar packed leaching solvents may offer benefit for packed leaching including higher contaminant partitioning into the packed leaching solvent.

In packed leaching processes of the current invention, the pressure may be from atmospheric up to less than about 1,000 atm.

In packed leaching processes of the current invention, the packed leaching temperature may be at or below the normal boiling point of the packed leaching solvent. In addition, the pressure in such cases may be at or above atmospheric pressure. In embodiments of the present invention, the bulk extraction is packed leaching, and the pressure of the packed leaching is about atmospheric, and the packed leaching solvent is at or below the normal boiling point. For polyolefin first plastics, preferred packed leaching solvents for packed leaching have boiling points less than about 90° C. Examples of such solvents are THF, di-methyl ether, propane, ethane, hexane, propanols, di-ethyl ether, hexanes, acetone, ethanol, methanol, propanol, iso-propanol, MEK, and Ethyl Acetate. In yet another embodiment of the present invention, the packed leaching solvent has a normal boiling point below about 90C and the pressure is above atmospheric but below 1,000 atm.

In an embodiment of the present invention, the packed leaching solvent has a normal boiling point above the packed leaching temperature. In another embodiment of the present invention, wherein said packed leaching solvent is ethyl acetate; said temperature of said packed leaching is between about 20° C. and about 120° C.; and said pressure of said packed leaching is between about atmospheric and about 1,000 atm. In another embodiment of the present invention, wherein said bulk purification is packed leaching; wherein said packed leaching solvent is hexanes; said temperature of said packed leaching is between about 20° C. and about 120° C.; and said pressure of said packed leaching is between about atmospheric and about 1,000 atm.

Packed leaching solvents with a normal boiling point below the packed leaching temperature are also preferred due to the elevated packed leaching pressures. In embodiments of the present invention, the packed leaching solvent has a normal boiling point below the packed leaching temperature. In an embodiment of the present invention, the packed leaching solvent is propane. In an embodiment of the present invention, wherein said bulk purification is packed leaching; wherein said packed leaching solvent is propane; said temperature of said packed leaching is between about 20° C. and about 120° C.; and said pressure of said packed leaching is between about 9 atm and about 1,000 atm. In another embodiment of the present invention, the packed leaching solvent is di-methyl ether (DME). In an embodiment of the present invention, wherein said bulk purification is packed leaching; wherein said packed leaching solvent is DME; said temperature of said packed leaching is between about 20° C. and about 120° C.; and said pressure of said packed leaching is between about 6 atm and about 1,000 atm.

Packed leaching solvents with normal boiling point below the packed leaching temperature and with a critical temperature below the packed leaching temperature are also preferred. In embodiments of the present invention, the packed leaching solvent has a normal boiling point below the packed leaching temperature and has a critical temperature below the packed leaching temperature. In an embodiment of the present invention, the packed leaching solvent is ethane. In another embodiment the present invention, the packed leaching solvent is critical or supercritical ethane. In even yet another embodiment of the present invention, wherein said bulk purification is packed leaching; wherein said packed leaching solvent is ethane; said temperature of said packed leaching is between about 31° C. and about 120° C.; and said pressure of said packed leaching is between about 40 atm and about 1,000 atm. In yet another embodiment the present invention, the packed leaching solvent is $CO_2$. In even yet another embodiment of the present invention, wherein said bulk purification is packed leaching; wherein said packed leaching solvent is $CO_2$; said temperature of said packed leaching is between about 31° C. and about 120° C.; and said pressure of said packed leaching is between about 68 atm and about 1,000 atm. In even yet another embodiment the present invention, the purification packed leaching solvent is $CO_2$ with <5 wt % H2O.

For percolation packed leaching of the current invention, the density of the packed leaching solvent is not important. For immersion packed leaching of the current invention, the density of the packed leaching solvent is preferably less than the density of the first plastic at the temperature and pressure of the packed leaching. For polyethylene reclaimed materials, the density of the immersion packed leaching solvent at the temperature and pressure of the packed leaching is preferably less than about 0.90 g/cc, but higher densities may still be used if a packed bed type of immersion process is used.

Preferred packed leaching solvents include solvents that have higher affinity for the chemical contaminants than for the first plastic. Solvents with high affinity for the chemical contaminants of interest in reclaimed polyolefins relative to the affinity of these for the polyolefins include but are not limited to diethyl ether, MEK, ethyl acetate, THF, acetone, methylene chloride, and methanol. Other oxygenated and polar hydrocarbon solvents likely have similar desired affinity. Solvents lacking such characteristics can still be used, but higher solvent to polymer ratios may be required. It is preferred that the solvent should not significantly dissolve the first plastic at the temperature and pressure of the process (<~5 wt % may be dissolved). For packed leaching processes of the current invention, the packed leaching solvent should preferably not significantly soften or swell the first plastic else agglomeration of the packed first plastic could become problematic. This is especially the case in packed beds and screw-based conveyer packed leaching wherein the first plastic may be under significant compaction pressure.

In embodiments of the present invention, said packed leaching solvent is selected from the group comprising hydrocarbons. In another embodiment of the present invention, said leaching solvent is selected from the group comprising aliphatic hydrocarbons. In even another embodiment of the present invention, said leaching solvent is selected from the group comprising aromatic hydrocarbons. In even yet another embodiment of the present invention, said leaching solvent is selected from the group comprising alkanes.

In embodiments of the present invention, said leaching solvent is selected from the group comprising methane, ethane, propane, normal butane, isobutane, normal pentane, isopentane, neopentane, hexanes (normal hexane, isohexane, neohexane, heptanes), octanes, or mixtures thereof.

The temperature may be changed during the course of the extraction process but is generally consistent within a given stage of a unit operation. The pressure may be changed to vary solubility of the solvent in the first plastic or to increase solubility of the chemical contaminant within the solvent.

A packed leaching extraction process may take place in stages and be combined with additional packed leaching extraction processes of other types. The same is true for liquid-liquid extraction processes. In addition, liquid-liquid processes may be combined with packed leaching processes in various stages to form a given purification process. In embodiments of the present invention, the number of stages is more than one. In another embodiment of the present invention, the number of liquid-liquid stages is more than one. In yet another embodiment of the present invention, the number of packed leaching stages is more than one. In still yet another embodiment of the present invention, the number of liquid-liquid stages is one or more and the number of packed leaching stages is one or more. A single stirred tank reactor will achieve a certain removal efficiency. The efficiency can be improved by having multiple stirred tank reactors in series wherein the first plastic from the $1^{st}$ stage is predominately separated from the $1^{st}$ stage purification solvent and this $1^{st}$ stage plastic is used in the $2^{nd}$ stage with fresh purification solvent. This is repeated for each additional stage. This method improves the removal efficiency at the expense of additional reactors and complexity but maintains the overall time, throughput, and solvent utilization.

While not wishing to be bound by theory, the theoretical maximum contaminant removal capacity for a packed leaching process is based upon the thermodynamic equilibrium/partitioning of the chemical contaminants between the first plastic and packed leaching solvent at the temperature and pressure of the process. Thermodynamic equilibrium may not be achieved due to kinetic limitations in the packed leaching process. This is true for the complete packed leaching process and is also true for each packed leaching stage. A higher packed leaching solvent to first plastic mass ratio will drive both thermodynamics and kinetics in favor of purification at the expense of greater solvent consumption and greater extraction process size, which equals greater cost. Thus, a balance must be found between these important design and operational variables for the targeted chemical contaminant removal efficiency. In general, the applicants have found that the total fresh or renewed packed leaching solvent to first plastic mass ratio is preferably above ~ about 5:1, more preferably above ~ about 10:1, more preferably above ~ about 15:1, even more preferably above ~ about 20:1, and most preferably above ~ about 30:1 but less than about 100:1. If the packed leaching is completed in progressive or sequential stages, then the packed leaching solvent to first plastic ratio per stage may be lower than this stated range (but still above the per stage minimum of ~5:1), but the total solvent used to the total first plastic represented by the sum of solvent used in all stages should be within this range. In addition, the contaminated solvent from any stage may be used "as-is" as the solvent for another stage.

Contaminated solvent at any point in the process may be renewed through known methods of distillation, filtration, ion-exchange, etc or combinations.

Another important kinetic driver is surface area to volume ratio of the first plastic within and exposed to the packed leaching solvent. In general, the time required to extract a chemical contaminant from a first plastic, is a strong function of the diffusion pathlength within the first plastic. The diffusion pathlength is indirectly proportional to the surface area to volume ratio of the geometrical form of the first plastic and the ability to access the surface area with packed leaching solvent. Hence, a higher surface area to volume ratio will produce a reduced diffusion pathlength and faster diffusion kinetics. For packed leaching processes, a high surface area to volume ratio is a critical parameter for quick and efficient contaminant removal both surface and bulk.

For packed leaching extractions, the surface area to volume ratio of the first plastic within and exposed to the extracting solvent is essentially identical to the surface area to volume ratio of the first plastic since the processing temperature is below the primary melting point. For film based reclaim, the packed leaching process is ideal because of the extremely high inherent surface area to volume ratio. If reclaimed material is provided in other forms with lower surface area to volume ratio such as pellets, granulated bottles, granulated parts, etc., then it will be advantageous to increase the surface area to volume ratio by various means. These means include but are not limited to mechanical grinding, cryogenic grinding, calendaring, pressing, extension, etc. The applicants have found that the utilization of first plastics with a surface area to volume ratio of greater than ~1 mm-1, greater than ~5 mm-1 is preferred, greater than ~20 mm-1 is even more preferred, and greater than ~50 mm-1 is most preferred. In embodiments of the present invention, the surface area to volume ratio of said first plastic is greater than about 1 mm-1. In another embodiment of the present invention, the surface area to volume ratio of said first plastic is greater than about 5 mm-1. In yet another embodiment of the present invention, the surface area to volume ratio of said first plastic is greater than about 20 mm-1. In even yet another embodiment of the present invention, the surface area to volume ratio of said first plastic is greater than about 50 mm-1.

A known means for increasing the effective mass transfer through a given surface area to volume ratio and given set of conditions at the first plastic solvent interface is through applying energy to the first plastic such as but not limited to vibrational in the form of ultrasonic energy and/or microwave.

Following the bulk purification involving extraction, the plastic may be devolatilized to produce a purer plastic. The contaminated solvent will contain a small amount of dissolved purer plastic, the extracted contaminants, and the pure leaching solvent. There are many ways to recover the purer polymer and bulk purification solvent independent of the extracted contaminants.

In general, a small amount of first plastic may dissolve into the leaching solvent regardless of process type or solvent. In particular, low molecular weight waxes are particularly prone to solubilization into the extracting solvent. These may become problematic in distillation-based recovery of the purified solvent due to deposition of the waxes on process equipment. Methods are known to reduce this tendency. One such method is to lower the temperature of the contaminated solvent to below the cloud point to precipitate the polymer or wax phase followed by filtration. Unlike the first plastic, the residual plastic or waxes resulting plastic from the precipitation from the contaminated solvent may contain significant chemical contamination.

Distillation of the contaminated bulk purification solvent may be used to regenerate the solvent for re-use in the various extraction operations. However, distillation may not be economically feasible on-going considering the high solvent volume utilized in the present invention. In addition, because the chemical contaminants of interest in this invention are extremely low in concentration, the concentration of these chemical contaminants in the contaminated solvent may be correspondingly low or even lower. Thus, a preferred method to purify the contaminated solvent is through direct removal of the contaminants without volatilizing the bulk solvent phase. Such methods include ion exchange, adsorption/absorption methods, etc. Examples include passing the contaminated solvent through a bed of activated carbon or alumina. This method can be used alone or in combination with distillation to achieve the right level of purification at the right energy consumption. In addition, the contaminated solvent from any stage may be used "as-is" as the solvent for another stage. Contaminated solvent at any point in the process may be renewed through known methods of distillation, filtration, ion-exchange, etc or combinations. In an embodiment of the present invention, said packed leaching solvent is purified using absorption or adsorption-based methods. In another embodiment of the present invention, said packed leaching solvent is purified using absorption or adsorption based methods followed by distillation.

The purer plastic may contain small amounts of the solvent in either physically adsorbed or bulk absorbed form. The concentration of the solvent in the purer plastic may be reduced by devolatilization techniques. In embodiments of the present invention, said purer plastic is devolatilized to a content of <1 wt % solvent in the first plastic.

Overall, packed leaching is significantly more effective than methods of the prior art in removing the targeted contaminants. For example, using supercritical $CO_2$, removal efficiencies in the range from about 55% up to greater than about 85% were obtained. In addition, using supercritical ethane, a removal efficiency of greater than about 90% was obtained with most targeted chemical contaminants being removed below LOQ. In addition, using propane, a removal efficiency of greater than about 97% was obtained with all targeted chemical contaminants approaching LOQ. Finally, using DME, a removal efficiency from about 94% to about greater than 98% was obtained.

In embodiments of the present invention, said packed leaching solvent comprises a supercritical fluid; said supercritical fluid comprises ethane; said temperature of said packed leaching is from about 35° C. to about 90C; wherein said pressure is between about 73 atm and about 1,000 atm; wherein said packed leaching solvent is $CO_2$.

In an embodiment of the present invention (Example 1A Table 7), said packed leaching solvent comprises a supercritical fluid; said supercritical fluid comprises $CO_2$; said temperature of said packed leaching is about 80° C.; said pressure of said packed leaching is about 340 atm; said $CO_2$ to first plastic mass ratio is ~20:1; said first plastic has a surface area to volume ratio of ~6 l/mm; and said average packed leaching time is ~110 minutes; wherein the purification process results in an average removal efficiency for bisphenol-A, 4-tert-pentylphenol, OCDD, PCB 118, and di-2-ethylhexyl phthalate is about 67%.

In another embodiment of the present invention (Example 1B and Table 7), said packed leaching solvent comprises a supercritical fluid; said supercritical fluid comprises $CO_2$; said first plastic has a surface area to volume ratio of ~6 l/mm; said temperature of said packed leaching is about 90° C.; said packed leaching involves 2 stages; said pressure of said packed leaching stage 1 is about 340 atm; said $CO_2$ to first plastic mass ratio for stage 1 is ~30:1; and said average extraction time for stage 1 is ~110 minutes; wherein said pressure of said packed leaching stage 2 is about 680 atm; said $CO_2$ to first plastic ratio for stage 2 is ~30:1; and said average extraction time for stage 2 is ~110 minutes; wherein the packed leaching results in an average removal efficiency for bisphenol-A, 4-tert-pentylphenol, OCDD, PCB 118, and di-2-ethylhexyl phthalate >about 85%.

In another embodiment of the present invention (Example 1C Table 7), said packed leaching solvent comprises a supercritical fluid; said supercritical fluid comprises $CO_2$ saturated with water; said temperature of said packed leaching is about 80° C.; said pressure of said packed leaching is about 340 atm; said $CO_2$ to first plastic mass ratio is ~20:1; said first plastic has a surface area to volume ratio of ~6 l/mm; and said average extraction time is ~70 minutes; wherein the packed leaching results in an average removal efficiency for bisphenol-A, 4-tert-pentylphenol, OCDD, PCB 118, and di-2-ethylhexyl phthalate >77%.

In embodiments of the present invention, said packed leaching solvent comprises a supercritical fluid; said supercritical fluid comprises ethane; said temperature of said packed leaching is from about 35° C. to about 90C; wherein said pressure is between about 48 atm and about 340 atm; wherein said packed leaching solvent is ethane.

In another embodiment of the present invention (Example 2 Table 8), said packed leaching solvent comprises a supercritical fluid; said supercritical fluid comprises ethane; said temperature of said packed leaching is from about 70° C.; said pressure of said bulk purification is varied between about 340 atm and about 82 atm; wherein said packed leaching is completed in 13 stages; wherein the ethane to first plastic overall mass ratio is about 34 and total extraction time is about 278 minutes; wherein the packed leaching results in an average removal efficiency for bisphenol-A, 4-tert-pentylphenol, OCDD, PCB 118, and di-2-ethylhexyl phthalate of greater than 90%.

In embodiments of the present invention, said packed leaching solvent comprises propane; said temperature of said packed leaching is from about 20° C. to about 90C; wherein said pressure is between about 7 atm and about 1,000 atm.

In another embodiment of the present invention (Example 3 Table 9), said packed leaching solvent comprises propane; said temperature of said packed leaching is about 70° C.; said pressure of said packed leaching is about 238 atm; wherein said packed leaching involves 3 packed leaching stages; wherein stage 1 involves a di-methyl-ether to first plastic mass ratio of ~7.3 and a time of about 29.9 minutes; wherein stage 2 involves a propane to first plastic mass ratio of 0 for a time of about 60 minutes; wherein stage 3 involves a propane to first plastic mass ratio of ~12.2 for a time of about 49.9 minutes for a total propane to first plastic mass ratio of ~19.5 and a total packed leaching time of about 139.8 minutes; said first plastic has a surface area to volume ratio of ~6 l/mm; wherein the packed leaching results in an average removal efficiency for bisphenol-A, 4-tert-pentylphenol, OCDD, PCB 118, and di-2-ethylhexyl phthalate >about 96.5%.

In embodiments of the present invention, said packed leaching solvent comprises di-methyl ether; said temperature of said packed leaching is from about 20° C. to about 90C; wherein said pressure is between about 5 atm and about 1,000 atm.

In another embodiment of the present invention (Example 4A Table 10), said packed leaching solvent comprises di-methyl-ether; said temperature of said packed leaching is about 70°C.; said pressure of said packed leaching is about 238 atm; wherein said packed leaching involves 3 packed leaching stages; wherein stage 1 involves a di-methyl-ether to first plastic mass ratio of ~9.5 and a time of about 37.3 minutes; wherein stage 2 involves a di-methyl-ether to first plastic mass ratio of 0 for a time of about 60 minutes; wherein stage 3 involves a di-methyl-ether to first plastic mass ratio of ~15.8 for a time of about 62.2 minutes for a total di-methyl-ether to first plastic mass ratio of ~25.3 and a total packed leaching time of about 159.5 minutes; said first plastic has a surface area to volume ratio of ~6 l/mm; and said average extraction time is ~160 minutes; wherein the packed leaching results in an average removal efficiency for bisphenol-A, 4-tert-pentylphenol, OCDD, PCB 118, and di-2-ethylhexyl phthalate >about 98.3%.

In another embodiment of the present invention, said packed leaching solvent comprises di-methyl-ether (Example 4B Table 10); said temperature of said packed leaching is about 70° C.; said pressure of said packed leaching is about 27 atm; wherein said packed leaching involves 3 packed leaching stages; wherein stage 1 involves a di-methyl-ether to first plastic mass ratio of ~8 and a time of about 33.8 minutes; wherein stage 2 involves a di-methyl-ether to first plastic mass ratio of 0 for a time of about 60 minutes; wherein stage 3 involves a di-methyl-ether to first plastic mass ratio of ~13.3 for a time of about 56.4 minutes for a total di-methyl-ether to first plastic mass ratio of ~21.3 and a total packed leaching time of about 150.2 minutes; said first plastic has a surface area to volume ratio of ~6 l/mm; wherein the packed leaching results in an average removal efficiency for bisphenol-A, 4-tert-pentylphenol, OCDD, PCB 118, and di-2-ethylhexyl phthalate >about 95%.

In embodiments of the present invention, said packed leaching solvent comprises ethyl acetate; said temperature of said packed leaching is from about 20° C. to about 90C; wherein said pressure is between about atmospheric pressure and about 340 atm.

In another embodiment of the present invention, said packed leaching solvent comprises ethyl-acetate (Example 5 Table 11); said temperature of said packed leaching is about 70° C.; said pressure of said packed leaching is about 10 atm; wherein said packed leaching involves 3 packed leaching stages; wherein stage 1 involves a ethyl-acetate to first plastic mass ratio of ~11.1 and a time of about 27.5 minutes; wherein stage 2 involves a ethyl acetate to first plastic mass ratio of 0 for a time of about 60 minutes; wherein stage 3 involves a ethyl acetate to first plastic mass ratio of ~18.5 for a time of about 45.8 minutes for a total ethyl acetate to first plastic mass ratio of ~29.6 and a total packed leaching time of about 133.3 minutes; said first plastic has a surface area to volume ratio of ~6 l/mm; wherein the packed leaching results in an average removal efficiency for bisphenol-A, 4-tert-pentylphenol, OCDD, PCB 118, and di-2-ethylhexyl phthalate >about 94.1%.

Following the packed leaching, the purer plastic may be physically wetted with the residual solvent and potentially contain a small amount of absorbed solvent. As discussed earlier, there are many ways to recover the purer polymer and bulk purification solvent independent of the extracted contaminants. The purer polymer can be dried and devolatilized by many known commercial means. One method is through cyclonic drying. Another method is through melt extrusion with a devolatilization section. In embodiments of the present invention, the purer plastic is processed to reduce the packed leaching solvent to below about 1 wt % in the first plastic. The contaminated solvent can be cleaned with known methods of distillation, ion exchange, filtration, etc. The resulting devolatilized first plastic may be used as it or may be further processed into other forms including pellets via various processes.

VI. Surface+Bulk Purification

In general, the combination of surface purification methods with bulk purification methods provide benefits to the overall removal of contamination. Surface purification methods will effectively remove surface contamination both impermeable and permeable including chemical contaminants and chemical contaminant precursors. Thus, the surface purification lowers the burden on the bulk purification and allows such to be more effective. If a first plastic is heavily contaminated with surface contamination, then such contamination is preferably removed first by a surface purification method and then followed by a bulk purification method. Once the surface purification method removes the surface contamination, the bulk purification method will remove the remaining bulk permeable contamination. The only contamination not significantly removed by this two-step approach is bulk impermeable contamination such as heavy metals that were intentionally added during original plastic part production.

Preferred methods of surface washing have already been discussed in the surface purification section. An even more preferred method of surface washing is the de-inking method also described in the surface purification method (Comparative Example 3). This method not only removes surface contamination such as dirt but also removes surface printed inks. The method is also quite effective at removing paper labels, which are chemical contaminant precursors. In this method, first plastic with the original surface area exposed is fed to a multi-step aqueous washing process where the surface contamination including surface printed inks, dirt, grit, paper, adhesives, etc. are removed. The resulting material is then dried. The dried material may be further densified into pellets using extrusion including devolatilization and melt filtration. For the purposes of this invention, a de-inking method is any surface washing method wherein said method removes surface print sufficient to produce less than about a 10% difference in the delta E between the de-inked and the unprinted first plastic (delta E measured using Method 3 in Section IX).

For nomenclature purposes, the contaminated plastic that is fed to the surface purification method will be termed the first plastic. The resulting surface purified plastic will be termed the second plastic. The second plastic will be fed to the bulk purification process and will be purified to the purer plastic. The surface purification method may involve multiple surface purification processes. The bulk purification method may involve multiple bulk purification processes of various types. The removal efficiency for the combined surface and bulk purification methods will be calculated from the first plastic concentration and the associated purer plastic.

The combination of surface washing with bulk purification technologies of the present invention provided an average removal efficiency for bisphenol-A, 4-tert-pentylphenol, OCDD, PCB 108, and di-2-ethylhexyl phthalate greater than about 96% up to greater than about 98% (Examples 6 through 9 and Tables 12 through 15). In most cases, the targeted contaminants were removed to levels approaching or below LOQ, which would potentially enable use in controlled end markets.

In embodiments of the present invention, a method to produce a purer plastic from a first plastic is presented; wherein said first plastic has a concentration of contaminants; wherein said purer plastic has a concentration of contaminants; wherein said contaminants of said first plastic comprise at least one of the following chemical classes; dioxins, PCBs, phthalates, bisphenols, and alkyl phenols; wherein said method comprises 1) a surface washing method to remove surface contamination followed by 2) an extraction conducted at a temperature and a pressure, and using a leaching solvent; wherein said surface washing method removes greater than 80% of the loose surface contamination; wherein said method reduces said concentration of contaminants in said first plastic to said concentration of contaminants in said purer plastic; and wherein the average of said reductions of said concentrations of contaminants from said first plastic to said purer plastic is at least about 55% or LOQ.

In embodiments of the present invention, said extraction takes place after a surface washing. In another embodiment of the present invention, said extraction takes place after a surface washing wherein the first plastic is not densified prior to surface washing. In yet another embodiment of the present invention, said extraction takes place after a surface washing; wherein the first plastic is not densified prior to surface washing; wherein the second plastic may be densified prior to the extraction process.

In embodiments of the present invention, said extraction uses a leaching solvent operating at a temperature and pressure; wherein said bulk purification processes operates in stages; wherein said first plastic has been partially purified using a surface washing process.

In an embodiment of the present invention (Example 6 Table 12), wherein said surface washing involves commercially available de-inking by Cadel; wherein said surface washing removes >80% of the loose surface contamination; wherein said bulk purification involves packed leaching in a packed bed; wherein said bulk purification solvent comprises a supercritical fluid; said supercritical fluid comprises $CO_2$; said first plastic has a surface area to volume ratio of ~6 1/mm; said temperature of said bulk purification is about 90° C.; said bulk purification involves 2 stages; said pressure of said bulk purification stage 1 is about 340 atm; said $CO_2$ to first plastic mass ratio for stage 1 is ~30:1; and said average extraction time for stage 1 is ~180 minutes; wherein said pressure of said bulk purification stage 2 is about 680 atm; said $CO_2$ to first plastic ratio for stage 2 is ~30:1; and said average extraction time for stage 2 is ~180 minutes; wherein the purification process results in an average removal efficiency for bisphenol-A, 4-tert-pentylphenol, OCDD, PCB 108, and di-2-ethylhexyl phthalate >about 96%.

In another embodiment of the present invention (Example 7 Table 13), wherein said surface washing involves commercially available de-inking by Cadel; wherein said surface washing removes greater than 80% of the loose surface contamination; wherein said bulk purification involves packed leaching in a packed bed wherein; said packed leaching solvent comprises a supercritical; said supercritical fluid is ethane; said temperature of said packed leaching is about said pressure of said bulk purification is varied between about 340 atm and 82 atm; wherein said packed leaching is completed in 13 stages; wherein the ethane to first plastic overall mass ratio is about 34 and total extraction time is about 278 minutes; wherein the packed leaching results in an average removal efficiency for bisphenol-A, 4-tert-pentylphenol, OCDD, PCB 108, and di-2-ethylhexyl phthalate of greater than about 96%.

In another embodiment of the present invention (Example 8 Table 14), wherein said surface washing involves commercially available de-inking by Cadel; wherein said surface washing removes greater than 80% of the loose surface contamination; wherein said bulk purification involves packed leaching; wherein said packed leaching solvent comprises di-methyl-ether; said temperature of said packed leaching is about 70° C.; said pressure of said packed leaching is about 238 atm; wherein said packed leaching involves 3 packed leaching stages; wherein stage 1 involves a di-methyl-ether to first plastic mass ratio of ~9.5 and a time of about 37.3 minutes; wherein stage 2 involves a di-methyl-ether to first plastic mass ratio of 0 for a time of about 60 minutes; wherein stage 3 involves a di-methyl-ether to first plastic mass ratio of ~15.8 for a time of about 62.2 minutes for a total di-methyl-ether to first plastic mass ratio of ~25.3 and a total packed leaching time of about 159.5 minutes; said first plastic has a surface area to volume ratio of ~80 l/mm; wherein the packed leaching results in an average removal efficiency for bisphenol-A, 4-tert-pentylphenol, OCDD, PCB 108, and di-2-ethylhexyl phthalate >about 98.3%.

In another embodiment of the present invention (Example 9A Table 15), wherein said surface washing involves commercially available de-inking by Cadel; wherein said surface washing removes loose surface contamination >80%; wherein said bulk purification involves packed leaching; wherein said packed leaching solvent comprises di-methyl-ether; said temperature of said packed leaching is about 70° C.; said pressure of said packed leaching is about 27 atm; wherein said packed leaching involves 3 packed leaching stages; wherein stage 1 involves a di-methyl-ether to first plastic mass ratio of ~7.3 and a time of about 33.8 minutes; wherein stage 2 involves a di-methyl-ether to first plastic mass ratio of 0 for a time of about 60 minutes; wherein stage 3 involves a di-methyl-ether to first plastic mass ratio of ~12.2 for a time of about 56.4 minutes for a total di-methyl-ether to first plastic mass ratio of ~19.5 and a total packed leaching time of about 150.2 minutes; said first plastic has a surface area to volume ratio of ~6 l/mm; wherein the packed leaching results in an average removal efficiency for bisphenol-A, 4-tert-pentylphenol, OCDD, PCB 108, and di-2-ethylhexyl phthalate >about 93.9%.

In another embodiment of the present invention (Example 9B Table 15), wherein said surface washing involves commercially available de-inking by Cadel; wherein said surface washing removes >80% of the loose surface contamination; wherein said bulk purification involves packed leaching in a packed bed; wherein said packed leaching solvent comprises di-methyl-ether; said temperature of said packed leaching is about 70° C.; said pressure of said packed leaching is about 27 atm; wherein said packed leaching involves 3 packed leaching stages; wherein stage 1 involves a di-methyl-ether to first plastic mass ratio of ~7.4 and a time of about 33.8 minutes; wherein stage 2 involves a di-methyl-ether to first plastic mass ratio of 0 for a time of about 60 minutes; wherein stage 3 involves a di-methyl-ether to first plastic mass ratio of ~12.3 for a time of about 56.4 minutes for a total di-methyl-ether to first plastic mass ratio of ~19.7 and a total packed leaching time of about 150.2 minutes; said first plastic has a surface area to volume ratio of ~6 l/mm; wherein the packed leaching results in an average removal efficiency for bisphenol-A, 4-tert-pentylphenol, OCDD, PCB 108, and di-2-ethylhexyl phthalate >about 98%.

In embodiments of the present invention, a method to produce a purer plastic from a first plastic is presented; wherein said first plastic has a concentration of contaminants; wherein said purer plastic has a concentration of contaminants; wherein said contaminants of said first plastic comprise at least one of the following chemical classes; dioxins, PCBs, phthalates, bisphenols, and alkyl phenols; wherein said method comprises 1) a surface washing method to remove surface contamination followed by 2) an extraction conducted at a temperature and a pressure, and using a leaching solvent; wherein said extraction temperature is below the primary melting point of the first plastic called packed leaching; wherein said packed leaching solvent to first plastic ratio at a given stage and at any point in time is less than about 5:1; wherein said packed leaching is conducted for a period of time and a period of time per stage; wherein said packed leaching reduces said concentration of contaminants in said first plastic to said concentration of contaminants in said purer plastic; and wherein the average of said reductions of said concentrations of contaminants from said first plastic to said purer plastic is at least about 55% or LOQ.

In embodiments of the present invention, said extraction takes place after a surface washing; wherein said surface washing removes greater than 80% of the loosely bound surface contamination. In another embodiment of the present invention, said extraction takes place after a surface washing; wherein said surface washing is de-inking type; wherein said de-inking removes greater than 80% of the loosely bound surface contamination; wherein said de-inking results in a delta E change of <10%. In yet another embodiment of the present invention, said extraction takes place after a surface washing wherein the first plastic is not densified prior to surface washing. In yet another embodiment of the present invention, said extraction takes place after a surface washing; wherein the first plastic is not densified prior to surface washing; wherein the second plastic may be densified prior to the extraction process.

In an embodiment of the present invention (Example 6 Table 12), said surface washing involves commercially available de-inking by Cadel; wherein said surface washing removes loosely bound surface contamination >80%; said bulk purification comprises packed leaching at about 90° C. and a pressure of between about 340 and 680 atm; wherein said packed leaching solvent is $CO_2$; wherein said number of stages is 2; wherein said $CO_2$ to first plastic total mass fed ratio of ~60:1 and an average extraction time of ~360 minutes; average removal efficiency for bisphenol-A, 4-tert-pentylphenol, OCDD, PCB 118, and di-2-ethylhexyl phthalate of greater than about 96%.

In an embodiment of the present invention (Example 7 Table 13), said surface washing involves commercially available de-inking by Cadel; wherein said surface washing removes loosely bound surface contamination >80%; wherein said bulk purification involves packed leaching; wherein said packed leaching solvent comprises a supercritical fluid; wherein said supercritical fluid is ethane; wherein said temperature of said packed leaching is about 70° C.; wherein said pressure of said bulk purification is varied between about 340 atm and 82 atm; wherein said packed leaching is completed in 13 stages; wherein the ethane to first plastic total mass ratio is about 34 and total extraction time is about 278 minutes; wherein the packed leaching results in an average removal efficiency for bisphenol-A, 4-tert-pentylphenol, OCDD, PCB 118, and di-2-ethylhexyl phthalate of greater than about 96%.

In another embodiment of the present invention (Example 8 Table 14), said surface washing involves commercially available de-inking by Cadel; wherein said surface washing removes loosely bound surface contamination >80%; wherein said bulk purification involves packed leaching; wherein said packed leaching solvent is di-methyl-ether; wherein said temperature of said packed leaching is about 70° C.; wherein said pressure of said packed leaching is about 238 atm; wherein said packed leaching involves 3 packed leaching stages; wherein stage 1 involves a di-methyl-ether to first plastic mass ratio of ~9.5 and a time of about 37.3 minutes; wherein stage 2 involves a di-methyl-ether to first plastic mass ratio of 0 for a time of about 60 minutes; wherein stage 3 involves a di-methyl-ether to first plastic mass ratio of ~15.8 for a time of about 62.2 minutes for a total di-methyl-ether to first plastic mass ratio of ~25.3 and a total packed leaching time of about 159.5 minutes; wherein said first plastic has a surface area to volume ratio of ~6 l/mm; wherein said average extraction time is ~160 minutes; wherein the packed leaching results in an average removal efficiency for bisphenol-A, 4-tert-pentylphenol, OCDD, PCB 118, and di-2-ethylhexyl phthalate >about 98%.

In another embodiment of the present invention (Example 9A Table 15), said surface washing involves commercially available de-inking by Cadel; wherein said surface washing removes loosely bound surface contamination >80%; wherein said bulk purification involves packed leaching; wherein said packed leaching solvent comprises di-methyl-ether; wherein said temperature of said packed leaching is about 70° C.; wherein said pressure of said packed leaching is about 27 atm; wherein said packed leaching involves 3 packed leaching stages; wherein stage 1 involves a di-methyl-ether to first plastic mass ratio of ~7.3 and a time of about 33.8 minutes; wherein stage 2 involves a di-methyl-ether to first plastic mass ratio of 0 for a time of about 60 minutes; wherein stage 3 involves a di-methyl-ether to first plastic mass ratio of ~12.2 for a time of about 56.4 minutes for a total di-methyl-ether to first plastic mass ratio of ~19.5 and a total packed leaching time of about 150.2 minutes; wherein said first plastic has a surface area to volume ratio of ~6 l/mm; wherein the packed leaching results in an average removal efficiency for bisphenol-A, 4-tert-pentylphenol, OCDD, PCB 118, and di-2-ethylhexyl phthalate >about 94%.

In another embodiment of the present invention (Example 9B Table 15), said surface washing involves commercially available de-inking by Cadel; wherein said surface washing removes loosely bound surface contamination >80%; wherein said bulk purification involves packed leaching; wherein said packed leaching solvent comprises di-methyl-ether; wherein said temperature of said packed leaching is about 70° C.; wherein said pressure of said packed leaching is about 27 atm; wherein said packed leaching involves 3 packed leaching stages; wherein stage 1 involves a di-methyl-ether to first plastic mass ratio of ~7.4 and a time of about 33.8 minutes; wherein stage 2 involves a di-methyl-ether to first plastic mass ratio of 0 for a time of about 60 minutes; wherein stage 3 involves a di-methyl-ether to first plastic mass ratio of ~12.3 for a time of about 56.4 minutes for a total di-methyl-ether to first plastic mass ratio of ~19.7 and a total packed leaching time of about 150.2 minutes; wherein said first plastic has a surface area to volume ratio of ~6 l/mm; wherein the packed leaching results in an average removal efficiency for bisphenol-A, 4-tert-pentylphenol, OCDD, PCB 118, and di-2-ethylhexyl phthalate >about 98%.

VII. Purer Plastic

The purer plastic produced from the first plastic will have a lower level of contamination relative to the first plastic. The purer plastic from the bulk purification step may be further processed to produce a pellet or other end use material. If a pellet is desired, then such step could involve melt extrusion followed by pelletization. The melt extrusion may optionally include a melt filtration step and/or a devolatilization step. The melt extrusion may include additional ingredients to the purer plastic, such as AO, slip agents, anti-block agents, $TiO_2$, colorants, etc.

VIII. Examples

Comparative Example 1—Purification of High-Custody Post-Commercial Film Using Commercially Available Water Wash Process #1 followed by Melt Densification A first plastic material, consisting of High-Custody Post-Commercial Film #1, was fed into a commercially available purification process. The cleaning process consisted of shredding, various water washing steps, drying, and melt densification. The shredding homogenized the material while reducing its fundamental size. The aqueous water washing should have effectively removed surface contamination. However, the ability of this process to remove bulk permeable contamination should be minimal due to the low solubility of the chemical contaminants in the water. A small amount of volatile bulk contamination should be removed during drying and melt densification, but overall, the bulk contamination should be largely unaffected. Also, the high-custody post-commercial film source used as the first plastic had limited chemical contamination as demonstrated by the low levels of pesticides, dioxins, and phthalates. The first plastic and purer plastic were analyzed for the classes of chemical contaminants typically present in recycled materials by GALAB Laboratories GmbH (Am Schleusengraben 7, 21029 Hamburg, Germany) using the methods disclosed in section IX Methods. After purification, the purer plastic contained a slightly reduced level of chemical contamination as shown in Table 3. The removal of the five selected species were as follows: For 4-tert-pentylphenol, the removal efficiency was 0%. For bisphenol A, the removal efficiency was 94%. For OCDD, the removal efficiency was 78%. For the PCB 118, the removal efficiency was 68%. For the di-2-ethylhexyl phthalate, the removal efficiency was 22%. The average removal efficiency for the five targeted species was about 52%.

TABLE 3

Purification of High-Custody Post-Commercial (HCPC) Source #1 using Commercial Water Washing Process #1

| Parameter | First Plastic HCPC #1 xLOQ | Purer Plastic HCPC #1 After Water Washing Process #1 xLOQ | Removal Efficiency % |
|---|---|---|---|
| Pesticides | | | |
| Piperonyl butoxide | <1 | <1 | n.a. |
| Alkylphenol ethoxylates | | | |
| 4-t-Octylphenolhexaethoxylate | <1 | <1 | n.a. |
| iso-Nonylphenoltriethoxylate | <1 | <1 | n.a. |
| Alkylphenols | | | |
| iso-Nonylphenol | 190.0 | 174.0 | 8% |
| 4-tert-Pentylphenol | 19.4 | 44.0 | 0% |
| Bisphenols | | | |
| Bisphenol A | 46000.0 | 2800.0 | 94% |
| Dioxins and dioxinlike and PCB | | | |
| 1,2,3,6,7,8-HxCDD | <1 | <1 | n.a. |
| 1,2,3,4,6,7,8-HpCDD | 2.8 | <1 | >64% |
| OCDD | 11.1 | 2.4 | 78% |
| OCDF | <1 | <1 | n.a. |
| PCB 105 | 24.6 | 11.3 | 54% |
| PCB 118 | 50.7 | 16.3 | 68% |
| Organotin compounds | | | |
| Monobutyltin | <1 | <1 | n.a. |
| Dibutyltin | 1.7 | <1 | >70% |
| Phthalates | | | |
| Dibutyl phthalate | 26.0 | 13.2 | 49% |
| Di-2-ethylhexyl phthalate | 12.8 | 10.0 | 22% |
| Polycyclic aromatic hydrocarbons (PAH) | | | |
| Fluoranthene | 33.0 | 20.0 | 39% |
| Phenanthrene | 59.0 | 43.0 | 27% |

Comparative Example 2—Purification of High-Custody Post-Commercial Film #2 Using Water Wash Process #2 Followed by Melt Densification A first plastic material, consisting of High-Custody Post-Commercial Film #2, was fed into a purification process available on the market to produce a purer plastic. The cleaning process consisted of shredding, aqueous hot water washing, drying, and melt densification. As was the case with Water Wash Process #1, this process should remove surface contamination but be limited in ability to remove bulk permeable contamination. The first plastic and purer plastic were analyzed for the classes of chemical contaminants typically present in recycled materials by GALAB Laboratories GmbH (Am Schleusengraben 7, 21029 Hamburg, Germany) using the methods disclosed in section IX Methods, as shown in Table 4. The high-custody film source, first plastic, had limited chemical contamination as demonstrated by the low levels of dioxins, PCBs, phthalates, and PAHs. The purer plastic contained a mixture of increased and slightly decreased levels of chemical contamination. The increase in certain chemical contaminants were likely due to cross-contamination from other more heavily contaminated feed streams and/or variability in the contamination level of the current feed. The removal of the five selected species were as follows: For 4-tert-pentylphenol, the removal efficiency was 0%. For bisphenol A, the removal efficiency was 96%. For OCDD, the removal efficiency was 0%. For the PCB 118, the removal efficiency was 68%. For the di-2-ethylhexyl phthalate, the removal efficiency was 0%. The average removal efficiency for the five targeted species was about 14%.

TABLE 4

Purification of High-Custody Post-Commercial (HCPC) Source
2 using Commercial Water Washing Process #2

| Parameter | First Plastic HCPC #2 xLOQ | Purer Plastic HCPC #2 After Water Washing Process #2 xLOQ | Removal Efficiency % |
|---|---|---|---|
| Pesticides | | | |
| Piperonyl butoxide | <1 | <1 | n.a. |
| Alkylphenol ethoxylates | | | |
| 4-t-Octylphenolhexaethoxylate | <1 | <1 | n.a. |
| iso-Nonylphenoltriethoxylate | <1 | <1 | n.a. |
| Alkylphenols | | | |
| iso-Nonylphenol | 120.0 | 340.0 | 0% |
| 4-tert-Pentylphenol | 52.0 | 134.0 | 0% |
| Bisphenols | | | |
| Bisphenol A | 1800.0 | 72.0 | 96% |
| Dioxins and dioxinlike and PCB | | | |
| 1,2,3,6,7,8-HxCDD | <1 | <1 | n.a. |
| 1,2,3,4,6,7,8-HpCDD | <1 | 2.4 | >64% |
| OCDD | 2.6 | 10.5 | 0% |
| OCDF | <1 | <1 | n.a. |
| PCB 105 | 9.9 | 8.8 | 11% |
| PCB 118 | 14.5 | 17.4 | 0% |
| Organotin compounds | | | |
| Monobutyltin | 5.0 | <1 | >80% |
| Dibutyltin | <1 | <1 | n.a. |
| Phthalates | | | |
| Dibutyl phthalate | 10.8 | 12.4 | 0% |
| Di-2-ethylhexyl phthalate | 8.4 | 8.4 | 0% |
| Polycyclic aromatic hydrocarbons (PAH) | | | |
| Fluoranthene | 11.0 | 18.0 | 0% |
| Phenanthrene | 27.0 | 40.0 | 0% |

Comparative Example 3A—Purification of Post-Commercial #1 Film Using Commercial De-Inking Process from Cadel A first plastic material, consisting of Post-Commercial Film #1, was fed into a purification process available on the market from Cadel called De-inking (http://cadeldeinking.com/en/) to produce a purer plastic. The process consisted of shredding, aqueous de-inking, water washing/rinsing, and drying. From the patent art, the de-inking step involves elevated temperatures, elevated pH, and surfactants. The various washing steps should effectively remove surface contamination. In addition, small amounts of bulk permeable contamination will be removed due to the elevated temperatures, which will increase the diffusivity, and the potential increase in solubility of the contaminants in the water due to the surfactant/pH combination. However, the bulk extraction was expected to be low. The incoming first plastic was determined to have 0.125 wt % loosely bound surface contamination compared to about 0.02 wt % for the purer plastic in the form of shreds. Therefore, this cleaning process removed greater than 80% of the incoming loosely bound surface contamination. After cleaning but prior to analyzing the first plastic for chemical contamination, the shreds were melt densified using a single screw extruder at 190C to produce pellets. The pellets were ground to a mass average diameter of 300 to 500 microns. The first plastic and purer plastic were analyzed for the classes of chemical contaminants typically present in recycled materials by GALAB Laboratories GmbH (Am Schleusengraben 7, 21029 Hamburg, Germany) using the methods disclosed in section IX Methods, as shown in Table 5. The first plastic contained a moderate level of chemical contamination indicative of post-commercial film lacking a high custody lifecycle. For example, the incoming dioxins like OCDD were 40× the LOQ, which is higher than the previously described high-custody sources of COMPARATIVE EXAMPLES 1, 2, and 5. In addition, this particular source has a high level of paper contamination, which has the potential to form additional chemical contamination once re-melted for densification/pelletization. This particular source was especially high in alkylphenols (~1,000× the LOQ) further indicating the level of chemical contamination within this recycle source. This first plastic was composed of shredded film with significant portions being melted together into clumps of plastic. Hence, the effectiveness of surface washing techniques with this source will be somewhat inhibited due to the lack of access to the complete contaminated surfaces. After the deinking process, the purer plastic contained a reduced level of chemical contamination. The removal of the five selected species were as follows: For 4-tert-pentylphenol, the removal efficiency was 71%. For bisphenol A, the removal efficiency was 0%. For OCDD, the removal efficiency was 60%. For the PCB 118, the removal efficiency was 0%. For the di-2-ethylhexyl phthalate, the removal efficiency was 22%. The average removal efficiency for the five targeted species was about 31%.

Comparative Example 3B—Purification of Post-Household Film #1 Using Commercial De-Inking Process from Cadel A first plastic material, consisting of Post-Household Film #1, was fed into the surface purification process of COMPARATIVE EXAMPLE 3A to produce a purer plastic. The incoming first plastic was determined to have 0.047 wt % loosely bound surface contamination compared to about 0.003 wt % for the purer plastic. Therefore, this cleaning process removed greater than 80% of the incoming loosely bound surface contamination. Prior to analyzing for chemical contamination, the shreds of Post-Household Film #1 were melt densified using an extruder and pelletized. The pelletized material was ground to a mass average particle size of 300 to 500 microns. The first plastic and purer plastic were analyzed for the classes of chemical contaminants typically present in recycled materials by GALAB Laboratories GmbH (Am Schleusengraben 7, 21029 Hamburg, Germany) using the methods disclosed in section IX Methods, as shown in Table 5. The first plastic contained an extremely high level of chemical contamination including significant dirt. For example, the pesticide piperonylbutoxide was ~7× the LOQ; alkylphenol ethoxylates were ~1,000× the LOQ; dioxins and phthalates were ~300× the LOQ. The purer plastic contained a reduced level of chemical contamination. Note: The difference in removal efficacy between COMPARATIVE EXAMPLES 3A AND 3B despite using identical cleaning processes were likely due to 1). differences in the surface area exposed for the cleaning process, 2). the differences in the distribution of the chemical contaminants on the surface and within the bulk, and 3). inherent variability in the chemical contaminants within a sample and variability in the measurement technique. The removal of the five selected species were as follows: For 4-tert-pentylphenol, the removal efficiency was 38%. For bisphenol A, the removal efficiency was 92%. For OCDD, the removal efficiency was 21%. For the PCB 118, the removal efficiency was 0%. For the di-2-ethylhexyl phthalate, the removal efficiency was 73%. The average removal efficiency for the five targeted species was about 45%.

TABLE 5

Purification of Post-Commercial (PC) Source #1 and Post-Household (PH) Source #1 using Commercial De-inking

| Parameter | First Plastic 3A PC #1 xLOQ | Purer Plastic 3A PC #1 After De-inking xLOQ | 3A Removal Efficiency % | First Plastic 3B PH #1 xLOQ | Purer Plastic 3B PH #1 After De-inking xLOQ | 3B Removal Efficiency % |
|---|---|---|---|---|---|---|
| Pesticides | | | | | | |
| Piperonyl butoxide | 1.0 | <1 | >0% | 6.6 | <1 | >68% |
| Alkylphenol ethoxylates | | | | | | |
| 4-t-Octylphenolhexaethoxylate | 5.0 | <1 | >80% | 17.4 | 1.4 | 92% |
| iso-Nonylphenoltriethoxylate | 3.2 | <1 | >69% | 32.0 | 10.2 | 68% |
| Alkylphenols | | | | | | |
| iso-Nonylphenol | 920.0 | 136.0 | 85% | 300.0 | 130.0 | 57% |
| 4-tert-Pentylphenol | 1660.0 | 480.0 | 71% | 1720.0 | 1060.0 | 38% |
| Bisphenols | | | | | | |
| Bisphenol A | 4.8 | 11.4 | 0% | 144.0 | 11.0 | 92% |
| Dioxins and dioxinlike and PCB | | | | | | |
| 1,2,3,6,7,8-HxCDD | <1 | <1 | n.a. | 7.4 | 3.5 | 52% |
| 1,2,3,4,6,7,8-HpCDD | 3.8 | 3.0 | 20% | 63.0 | 31.0 | 51% |
| OCDD | 39.6 | 15.9 | 60% | 308.5 | 243.0 | 21% |
| OCDF | 5.5 | 2.8 | 49% | 13.8 | 12.9 | 7% |
| PCB 105 | 35.2 | 42.2 | 0% | 116.4 | 122.6 | 0% |
| PCB 118 | 45.7 | 52.6 | 0% | 15.1 | 176.0 | 0% |
| Organotin compounds | | | | | | |
| Monobutyltin | dnt | dnt | n.a. | 3.0 | dnt | n.a. |
| Dibutyltin | dnt | dnt | n.a. | 11.7 | dnt | n.a. |
| Phthalates | | | | | | |
| Dibutyl phthalate | 4.6 | <1 | >78% | 32.0 | 2.8 | 91% |
| Di-2-ethylhexyl phthalate | 12.6 | 9.8 | 22% | 700.0 | 188.0 | 73% |
| PAHs | | | | | | |
| Fluoranthene | 8.3 | 8.6 | 0% | 44.0 | 24.0 | 45% |
| Phenanthrene | 18.0 | 11.0 | 39% | 100.0 | 53.0 | 47% |

Comparative Example 4—Purification of High
Custody Post-Commercial #3 Film Using
Commercial De-Odorizing Process

| Parameter | First Plastic HCPC #3 xLOQ | Purer Plastic HCPC #3 After De-odorization xLOQ | Removal Efficiency % |
|---|---|---|---|
| Pesticides | | | |
| Piperonyl butoxide | <1 | <1 | n.a. |
| Alkylphenol ethoxylates | | | |
| 4-t-Octylphenolhexaethoxylate | <1 | <1 | n.a. |
| iso-Nonylphenoltriethoxylate | <1 | <1 | n.a. |
| Alkylphenols | | | |
| iso-Nonylphenol | 86.0 | 13.0 | 85% |
| 4-tert-Pentylphenol | 40.0 | 4.8 | 88% |
| Bisphenols | | | |
| Bisphenol A | 114.0 | 168.0 | 0% |
| Dioxins and dioxinlike and PCB | | | |
| 1,2,3,6,7,8-HxCDD | <1 | <1 | n.a. |
| 1,2,3,4,6,7,8-HpCDD | 3.4 | 3.0 | 12% |
| OCDD | 8.9 | 7.1 | 20% |
| OCDF | <1 | <1 | n.a. |
| PCB 105 | 9.2 | 5.3 | 42% |
| PCB 118 | 14.3 | 15.9 | 0% |
| Organotin compounds | | | |
| Monobutyltin | dnt | dnt | n.a. |
| Dibutyltin | dnt | dnt | n.a. |
| Phthalates | | | |
| Dibutyl phthalate | 8.4 | 3.4 | 60% |
| Di-2-ethylhexyl phthalate | 3.0 | 10.2 | 0% |
| Polycyclic aromatic hydrocarbons (PAH) | | | |
| Fluoranthene | 7.9 | 9.8 | 0% |
| Phenanthrene | 28.0 | 13.0 | 54% |

A first plastic material, consisting of High Custody Post-Commercial Film #3, was fed into a purification process stated to be a de-odorization technology. The process consisted of exposing the pelletized feed material to moderate temperatures and continuous air flushing. As such, this cleaning technique primarily removes volatile surface and bulk contamination. However, most of the chemical contaminants of relevance to controlled end markets are highly non-volatile. The first plastic and purer plastic were analyzed for the classes of chemical contaminants typically present in recycled materials by GALAB Laboratories GmbH (Am Schleusengraben 7, 21029 Hamburg, Germany) using the methods disclosed in section IX Methods, as shown in Table 6. The high-custody film source #3 had limited chemical contamination as demonstrated by the low levels of dioxins, PCBs, phthalates, and PAHs. The purer plastic contained a slightly reduced level of chemical contamination. The removal of the five selected species were as follows: For 4-tert-pentylphenol, the removal efficiency was 88%. For bisphenol A, the removal efficiency was 96%. For OCDD, the removal efficiency was 20%. For the PCB 118, the removal efficiency was 0%. For the di-2-ethylhexyl phthalate, the removal efficiency was 0%. The average removal efficiency for the five targeted species was about 41%.

Table 6

Purification of High-Custody Post-Commercial
(HCPC) Source #3 Using Commercial
De-Odorization In general, the established methods for purifying/cleaning films and other plastic waste including water washing, de-inking, and devolatilization are currently not able to sufficiently remove chemical contaminants, especially in sources that are high-custody. Even with high-custody sources, the chemical contamination is still present and not removed completely, which might limit end use for certain customers. Net, there is an unmet need for a cleaning technology that is capable of more completely removing chemical contamination sufficient for highly contaminated sources and for any market desiring purer recycled materials.

Example 1—Bulk Purification Involving Packed
Leaching in a Packed Bed with Supercritical $CO_2$
and a First Plastic of Ground Pelletized
Post-Commercial Film #3

EXAMPLE 1A—A first plastic material, consisting of pelletized Post-Commercial Film #3, was subjected to a grinding step to reduce mass average particle size from ~3 to 5 mm down to ~1 mm. The resulting first plastic had a surface area to volume ratio of ~6 mm-1. The resulting ground post-commercial film was fed to a bulk purification step involving packed leaching as follows (at Phasex Corporation, 125 Flagship Drive, North Andover, MA). About 168.1 g of the ground first plastic were loaded into a high pressure packed bed of 500 mL in volume. The temperature of the process was set to 80° C. (note: below the primary melting temperature of the first plastic) and the pressure was set to 340 atm. The $CO_2$ was introduced into the column at a $CO_2$ flow rate of ~15 standard L/min or $CO_2$ to first plastic mass ratio of about 20:1, a packed leaching solvent feed rate of ~15 SL/min or ~30 g/min. The total extraction time was ~110 minutes. The $CO_2$ to first plastic mass ratio at any point in time in the packed bed was between about 1 and 2:1. There was only 1 extraction step and 167.5 g of the purer plastic was collected. The first plastic and purer plastic #1 were analyzed for the classes of chemical contaminants typically present in recycled materials by GALAB Laboratories GmbH (Am Schleusengraben 7, 21029 Hamburg, Germany) using the methods disclosed in section IX Methods, as shown in Table 7. The first plastic was heavily contaminated. For example, the pesticide piperonyl butoxide was ~28× the LOQ, alkylphenol were ~100× the LOQ, bisphenol-A was 760×, dioxins/furans/PCBs were as high as ~200×, phthalates LOQ were ~20×, and PAHs LOQ were ~40χ. The purer plastic #1 was significantly cleaner in all aspects, but still had significant contaminants due to the extreme contamination of the feed source. The overall removal was higher than Example #2 due to the increased surface area to volume ratio offered by the ground pellet form. The removal of the five selected species were as follows: For 4-tert-pentylphenol, the removal efficiency was 79%. For bisphenol A, the removal efficiency was 77%. For OCDD, the removal efficiency was 30%. For the PCB 118, the removal efficiency was 59%. For the di-2-ethylhexyl phthalate, the removal efficiency was 91%. The average removal efficiency for the five targeted species was about 67%.

EXAMPLE 1B—The same ground first plastic material was fed to a bulk purification step of extraction involving Packed Leaching as follows. About ~105.0 g of the ground first plastic was loaded into a typical supercritical $CO_2$ extractor of 500 mL in volume and the extraction was conducted at about 90° C. (below the primary melting point of the first plastic), about 340 atm, and solvent to feed ratio of about 30:1 for approximately 110 min. The pressure was then increased to 680 atm where an additional 30:1 of solvent was introduced and held for another 110 min to produce a purer plastic #2. The overall solvent to first plastic mass ratio was about 60:1 for a total extraction time of about 220 minutes. The $CO_2$ to first plastic mass ratio at any point in time in the packed bed was between about 1 and 2:1. The purer plastic #2 was collected and had a mass of 104.4 g. The residue collected after evaporating the contaminated $CO_2$ was ~0.6 g. The purer plastic #2 were analyzed for the classes of chemical contaminants typically present in recycled materials by GALAB Laboratories GmbH (Am Schleusengraben 7, 21029 Hamburg, Germany) using the methods disclosed in section IX Methods, as shown in Table 7. The purer plastic #2 was significantly cleaner in all aspects compared to purer plastic #1 due to increased solvent to first plastic ratio, increased extraction time, and increased pressure, but still had significant contaminants due to the extreme contamination of the feed source. The removal of the five selected species were as follows: For 4-tert-pentylphenol, the removal efficiency was 99%. For bisphenol A, the removal efficiency was 87%. For OCDD, the removal efficiency was 50%. For the PCB 118, the removal efficiency was 93%. For the di-2-ethylhexyl phthalate, the removal efficiency was >94%. The average removal efficiency for the five targeted species was about >85%.

EXAMPLE 1C—The same ground first plastic material was fed to a bulk purification step of extraction of Packed Leaching as follows. About ~105.7 g of the ground first plastic was loaded to a typical supercritical $CO_2$ extractor of 500 mL in volume. The extraction was conducted with a purification solvent of $CO_2$ that contained a saturated amount of water at the purification temperature of about 80° C., about 340 atm, and $CO_2$ to first plastic mass ratio of about 20:1 at a $CO_2$ feed rate of ~15 SL/min or ~30 g/min and a total extraction time of approximately 70 minutes. The $CO_2$ to first plastic mass ratio at any point in time in the packed bed was between about 1 and 2:1. The small amount of water was added to increase the polar component of solubility and potentially extract more of the polar contaminants in the first plastic. A purer plastic #3 of approximately 105.0 g was produced and was analyzed for the classes of chemical contaminants typically present in recycled materials by GALAB Laboratories GmbH (Am Schleusengraben 7, 21029 Hamburg, Germany) using the methods disclosed in section IX Methods, as shown in Table 7. The purer plastic #3 was significantly cleaner in all aspects, but still had significant contaminants due to the extreme contamination of the feed source. The overall removal was higher than purer plastic #1 but slightly below purer plastic #2. However, the purer plastic #2 was produced at significantly longer purification times, higher solvent to first plastic ratio, and higher pressure. Thus, the addition of water was a significant improvement over $CO_2$ alone. The increased polarity created by the water likely increased the inherent solubility of the chemical contaminants in the solvent thus increasing flux and efficiency for a given time. The removal of the five selected species were as follows: For 4-tert-pentylphenol, the removal efficiency was >99%. For bisphenol A, the removal efficiency was 92%. For OCDD, the removal efficiency was 23%. For the PCB 118, the removal efficiency was 79%. For the di-2-ethylhexyl phthalate, the removal efficiency was >94%. The average removal efficiency for the five targeted species was greater than about 77%.

If water saturated $CO_2$ were combined with the pressure pulse, then further improvements in removal efficiency would likely be realized.

TABLE 7

Purification of Post-Commercial (PC) Film #3 Source using Solid/Liquid Extraction with scCO2 in a Packed Bed using standard conditions (Purer Plastic #1), pulsed conditions (Purer Plastic #2), and wet conditions (Purer Plastic #3)

| Parameter | First Plastic PC #3 xLOQ | Purer Plastic #1 PC #3 After scCO2 xLOQ | Purer Plastic #2 PC #3 After scCO2 Pulse xLOQ | Purer Plastic #3 PC #3 After scCO2 Wet xLOQ | Removal % scCO2 | Removal % scCO2 Pulse | Removal % scCO2 |
|---|---|---|---|---|---|---|---|
| Pesticides | | | | | | | |
| Piperonyl butoxide | 28.0 | 4.6 | 1.8 | 2.2 | 84% | 94% | 92% |
| Alkylphenol ethoxylates | | | | | | | |
| 4-t-Octylphenolhexaethoxylate | 6.2 | <1 | <1 | <1 | n.a. | n.a. | >84% |
| iso-Nonylphenoltriethoxylate | 5.8 | <1 | <1 | <1 | n.a. | n.a. | >82% |
| Alkylphenols | | | | | | | |
| iso-Nonylphenol | 260.0 | 28.0 | 1.5 | 4.0 | 89% | 99% | 98% |
| 4-tert-Pentylphenol | 116.0 | 24.0 | <1 | <1 | 79% | >99% | >99% |
| Bisphenols | | | | | | | |
| Bisphenol A | 760.0 | 176.0 | 98.0 | 62.0 | 77% | 87% | 92% |
| Dioxins and dioxinlike and PCB | | | | | | | |
| 1,2,3,6,7,8-HxCDD | 6.1 | 4.1 | 4.1 | 4.8 | 33% | 33% | 21% |
| 1,2,3,4,6,7,8-HpCDD | 84.5 | 54.0 | 33.2 | 52.5 | 36% | 61% | 38% |
| OCDD | 205.0 | 142.5 | 102.0 | 157.5 | 30% | 50% | 23% |
| 2,3,7,8-TCDF | <1 | <1 | <1 | <1 | n.a. | n.a. | n.a. |
| OCDF | 6.5 | 4.8 | 5.7 | 6.6 | 26% | 13% | −2% |
| PCB 105 | 157.2 | 64.2 | 14.5 | 33.8 | 59% | 91% | 78% |
| PCB 118 | 227.0 | 93.0 | 16.2 | 46.6 | 59% | 93% | 79% |
| Organotin compounds | | | | | | | |
| Monobutyltin | dnt | dnt | 2.7 | 3.3 | n.a. | n.a. | n.a. |
| Dibutyltin | dnt | dnt | 4.3 | 4.7 | n.a. | n.a. | n.a. |
| Phthalates | | | | | | | |
| Dibutyl phthalate | 22.0 | <1 | <1 | <1 | >95% | >95% | >95% |
| Di-2-ethylhexyl phthalate | 17.8 | 1.5 | <1 | <1 | 91% | >94% | >94% |
| PAHs | | | | | | | |
| Fluoranthene | 63.0 | 29.0 | 8.2 | 62.0 | 54% | 87% | 2% |
| Phenanthrene | 62.0 | 25.0 | 10.0 | 28.0 | 60% | 84% | 55% |

Example 2—Bulk Purification Using Packed Leaching in a Packed Bed of Ground Pelletized Post-Commercial Film #3 with Supercritical Ethane at 70C A first plastic material, consisting of pelletized Post-Commercial Film #3, was subjected to a grinding step to reduce mass average particle size from ~3 to 5 mm down to ~1 mm for a surface area to volume ratio of ~6 mm-1. This first plastic was fed to a bulk purification step of extraction involving Packed Leaching as follows (at Phasex Corporation, 125 Flagship Drive, North Andover, MA). About 100.5 g of the first plastic was loaded into a high pressure packed bed extractor of 500 mL volume. The extraction was completed in 13 stages. For stage #1, the bed was filled with an ethane to first plastic mass ratio of about 1.6 for a time of about 9.6 minutes at a pressure of 340 atm at 70C. For stage #2, an amount of ethane equal to about 1.2:1 ethane to first plastic mass ratio, was evacuated to lower the pressure to 82 atm followed by introduction of a similar 1.2 ethane to first plastic mass ratios to increase the pressure back to about 340 atm over a time period of about 14.6 minutes. This stage was repeated 5 times. For stage #7, ethane was added continuously to through the packed bed to a total ethane to first plastic ratio of about 10.2 for over about 61.2 minutes at about 340 atm; for stage #8 through #12, the stages #2 through #6 were repeated. For stage #13, the $7^{th}$ stage was replicated to produce the purer plastic. The total ethane to first plastic mass ratio was about 34 and the total extraction time was about 278 minutes. The contaminant mass collected by volatilizing the contaminated ethane was ~1.3 g. The purer plastic was collected and had a mass of ~99.2 g. The purer plastic was analyzed for the classes of chemical contaminants typically present in recycled materials by GALAB Laboratories GmbH (Am Schleusengraben 7, 21029 Hamburg, Germany) using the methods disclosed in section IX Methods, as shown in Table 8. The removal of the five selected species were as follows: For 4-tert-pentylphenol, the removal efficiency was 98%. For bisphenol A, the removal efficiency was 85%. For OCDD, the removal efficiency was 75%. For the PCB 118, the removal efficiency was >99.6%. For the di-2-ethylhexyl phthalate, the removal efficiency was >94%. The average removal efficiency for the five targeted species was greater than about 90%.

TABLE 8

Purification of Post-Commercial (PC) Film #3 Source
using Packed Leaching with scEthane in a Packed Bed at 70 C.

|  | First Plastic PC #3 xLOQ | Purer Plastic PC #3 After scEthane Extraction xLOQ | Removal Efficiency % |
|---|---|---|---|
| Pesticides | | | |
| Piperonyl butoxide | 28.0 | <1 | >96% |
| Alkylphenol ethoxylates | | | |
| 4-t-Octylphenolhexaethoxylate | 6.2 | <1 | >84% |
| iso-Nonylphenoltriethoxylate | 5.8 | <1 | >83% |
| Alkylphenols | | | |
| iso-Nonylphenol | 260.0 | 1.1 | 99.6% |
| 4-tert-Pentylphenol | 116.0 | 2.6 | 98.0% |
| Bisphenols | | | |
| Bisphenol A | 760.0 | 116.0 | 85% |
| Dioxins and dioxinlike and PCB | | | |
| 1,2,3,6,7,8-HxCDD | 6.1 | <1 | >83% |
| 1,2,3,4,6,7,8-HpCDD | 84.5 | 11.2 | 87% |
| OCDD | 205.0 | 51.5 | 75% |
| OCDF | 6.5 | <1 | >85% |
| PCB 105 | 157.2 | <1 | >99.3% |
| PCB 118 | 227.0 | <1 | >99.6% |
| Organotin compounds | | | |
| Monobutyltin | dnt | dnt | n.a. |
| Dibutyltin | dnt | dnt | n.a. |
| Phthalates | | | |
| Dibutyl phthalate | 22.0 | <1 | >95% |
| Di-2-ethylhexyl phthalate | 17.8 | <1 | >94% |
| Polycyclic aromatic hydrocarbons | | | |
| Fluoranthene | 63.0 | 6.4 | 90% |
| Phenanthrene | 62.0 | 4.3 | 93% |

Example 3—Bulk Purification Using Packed Leaching in a Packed Bed of Ground Pelletized Post-Commercial Film #3 with Propane at 70C A first plastic material, identical to the ground first plastic in EXAMPLE 2, was fed to a bulk purification step involving packed leaching as follows (at Phasex Corporation, 125 Flagship Drive, North Andover, MA). About 100.4 g of the first plastic was loaded into a high pressure packed bed extractor of 500 mL total volume. The extraction was carried out at about 70° C. and about 238 atm for a total of 3 stages. For all stages, the mass ratio of propane to first plastic in the packed bed was less than about 4:1. The first stage involved a propane to first plastic mass ratio of about 7.3 and an extraction time of about 30 minutes. The second stage was a hold for 60 minutes without new propane being added. The third stage involved a propane to first plastic mass ratio of about 12.2 for an extraction time of about 50 minutes. The total propane to first plastic mass ratio was about 19.5 for a total extraction time of 140 minutes. The purer plastic was collected and had a mass of 97.2 g with a contaminant residual in the evaporated contaminated propane. The purer plastic was analyzed for the classes of chemical contaminants typically present in recycled materials by GALAB Laboratories GmbH (Am Schleusengraben 7, 21029 Hamburg, Germany) using the methods disclosed in section IX Methods, as shown in Table 9. The purer plastic was significantly cleaner than the heavily contaminated feed material. The propane was surprisingly more effective in removal of a wide range of contaminants than supercritical ethane.

For 4-tert-pentylphenol, the removal efficiency was >99%. For bisphenol A, the removal efficiency was 96%. For OCDD, the removal efficiency was 94%. For the PCB 118, the removal efficiency was >99.6%. For the di-2-ethylhexyl phthalate, the removal efficiency was >94%. The average removal efficiency for the five targeted species was greater than about 97%.

TABLE 9

Purification of Post-Commercial (PC) Film #3 Source using Packed Leaching with Propane in a Packed Bed at 70 C.

| Parameter | First Plastic PC #3 xLOQ | Purer Plastic PC #3 After Propane Extraction xLOQ | Removal Efficiency % |
|---|---|---|---|
| Pesticides | | | |
| Piperonyl butoxide | 28.0 | <1 | >96% |
| Alkylphenol ethoxylates | | | |
| 4-t-Octylphenolhexaethoxylate | 6.2 | <1 | >84% |
| iso-Nonylphenoltriethoxylate | 5.8 | <1 | >83% |
| Alkylphenols | | | |
| iso-Nonylphenol | 260.0 | <1 | >99.6% |
| 4-tert-Pentylphenol | 116.0 | <1 | >99.1% |
| Bisphenols | | | |
| Bisphenol A | 760.0 | 30.0 | 96% |
| Dioxins and dioxinlike and PCB | | | |
| 1,2,3,6,7,8-HxCDD | 6.1 | <1 | >84% |
| 1,2,3,4,6,7,8-HpCDD | 84.5 | 4.7 | 94% |
| OCDD | 205.0 | 11.4 | 94% |
| OCDF | 6.5 | <1 | >85% |
| PCB 105 | 157.2 | <1 | >99.4% |
| PCB 118 | 227.0 | <1 | >99.6% |
| Organotin compounds | | | |
| Monobutyltin | dnt | dnt | n.a. |
| Dibutyltin | dnt | dnt | n.a. |
| Phthalates | | | |
| Dibutyl phthalate | 22.0 | <1 | >95% |
| Di-2-ethylhexyl phthalate | 17.8 | <1 | >94% |
| Polycyclic aromatic hydrocarbons (PAH) | | | |
| Fluoranthene | 63.0 | 2.7 | 96% |
| Phenanthrene | 62.0 | 3.9 | 94% |

Example 4—Bulk Purification Using Packed Leaching in a Packed Bed of Ground Pelletized of Post-Commercial Film #3 and Post-Household Film #1

Example 4A—Bulk Purification Using Packed Leaching in a Packed Bed of Ground Pelletized Post-Commercial Film #3 with DME A first plastic material, identical to the ground first plastic in EXAMPLE 2, was fed to a bulk purification step of extraction as follows (at Phasex Corporation, 125 Flagship Drive, North Andover, MA). The first plastic had a mass average particle size of ~1 mm and an average surface area to volume ratio of ~6 mm-1. About 101.4 g of the first plastic was loaded into a high pressure packed bed extractor of 500 mL total volume. The leaching solvent was di-methyl-ether (DME). The extraction was carried out at about 70° C., about 238 atm and included 3 stages. At all times, the DME to first plastic ratio was less than about 4:1. The solvent feed rate was about 26 g/min for about 37 minutes (DME:first plastic mass ratio of ~9.5:1) followed by a hold of about 60 minutes where no additional di-methyl-ether was added, followed by another feed of fresh di-methyl-ether of about 26 g/min (DME:first plastic mass ratio of ~15.8:1) for about 62 minutes. Thus, the total solvent to first plastic mass ratio was about 25:1 and the total extraction time was about 160 minutes. The contamination collected by evaporating the contaminated di-methyl-ether was ~3.6 g and the mass of the purer plastic was ~97.8 g. The purer plastic was analyzed for the classes of chemical contaminants typically present in recycled materials by GALAB Laboratories GmbH (Am Schleusengraben 7, 21029 Hamburg, Germany) using the methods disclosed in section IX Methods, as shown in Table 10. The purer plastic was almost completely below the LOQ for all chemical contaminants even with the heavily contaminated feed stream. If cleaner feed streams were to be used like high-custody post-commercial, then even cleaner purer plastic would result. For 4-tert-pentylphenol, the removal efficiency was >99.1%. For bisphenol A, the removal efficiency was >99.9%. For OCDD, the removal efficiency was 99%. For the PCB 118, the removal efficiency was >99.6%. For the di-2-ethylhexyl phthalate, the removal efficiency was >94%. The average removal efficiency for the five targeted species was greater than about 98%.

Example 4B—Bulk Purification Using Packed Leaching in a Packed Bed of Ground Post-Household #1 with DME A first plastic material, consisting of Post-Household #1 Film that had been melt densified using a single screw extruder to produce a 3 to 5 mm pellet and then ground to a mass average particle size of ~1 mm. Thus, the first plastic had a surface area to volume ratio of ~6 mm-1. This first plastic was fed to a bulk purification involving packed leaching as follows (at Phasex Corporation, 125 Flagship Drive, North Andover, MA). About 109.0 g of the first plastic was loaded into a high pressure packed bed extractor having a total volume of 500 mL. At all times, the DME to first plastic ratio in the packed bed was less than about 4:1. The extraction was carried out at 70° C. and a pressure of 27 atm, DME was introduced to the packed bed at a rate of ~26 g/min for a total of 34 minutes (DME:first plastic mass ratio ~8:1), followed by a 60 min hold where no additional di-methyl-ether was addled, followed by another stage of solvent flow of ~26 g/min for 56 minutes (DME:first plastic mass ratio ~13.3:1). Net, the total fed of DME to first places was ~21:1 and the total extraction time was ~150 minutes. The residue collected after evaporating the contaminated di-ethyl-ether had a mass of 2.9 g for a total purer plastic mass of ~ 106.1 g. The purer plastic was analyzed for the classes of chemical contaminants typically present in recycled materials by GALAB Laboratories GmbH (Am Schleusengraben 7, 21029 Hamburg, Germany) using the methods disclosed in section IX Methods, as shown in Table 10. For 4-tert-pentylphenol, the removal efficiency was >99.7%. For bisphenol A, the removal efficiency was 75%. For OCDD, the removal efficiency was 99.7%. For the PCB 118, the removal efficiency was >99.3%. For the di-2-ethylhexyl phthalate, the removal efficiency was 99.9%. The average removal efficiency for the five targeted species was greater than about >95%.

TABLE 10A

Purification of Post-Commercial (PC) Film #3 Source using Packed Leaching with DME in a Packed Bed at 70 C.

| Parameter | First Plastic PC #3 xLOQ | Purer Plastic PC #3 After DME xLOQ | Removal Efficiency % |
|---|---|---|---|
| Pesticides | | | |
| Piperonyl butoxide | 28.0 | <1 | >96% |
| Alkylphenol ethoxylates | | | |
| 4-t-Octylphenolhexaethoxylate | 6.2 | <1 | >84% |
| iso-Nonylphenoltriethoxylate | 5.8 | <1 | >83% |
| Alkylphenols | | | |
| iso-Nonylphenol | 260.0 | <1 | >99.6% |
| 4-tert-Pentylphenol | 116.0 | <1 | >99.1% |
| Bisphenols | | | |
| Bisphenol A | 760.0 | <1 | >99.9% |
| Dioxins and dioxinlike and PCB | | | |
| 1,2,3,6,7,8-HxCDD | 6.1 | <1 | >84% |
| 1,2,3,4,6,7,8-HpCDD | 84.5 | <1 | >99% |
| OCDD | 205.0 | 2.1 | 99% |
| OCDF | 6.5 | <1 | >85% |
| PCB 105 | 157.2 | <1 | >99.3% |
| PCB 118 | 227.0 | <1 | >99.6% |
| Organotin compounds | | | |
| Monobutyltin | dnt | dnt | n.a. |
| Dibutyltin | dnt | dnt | n.a. |
| Phthalates | | | |
| Dibutyl phthalate | 22.0 | <1 | >95% |
| Di-2-ethylhexyl phthalate | 17.8 | <1 | >94% |
| Polycyclic aromatic hydrocarbons (PAH) | | | |
| Fluoranthene | 63.0 | 4.6 | >93% |
| Phenanthrene | 62.0 | 3.8 | >94% |

TABLE 10B

Purification of Ground Post-Household (PH) Film #1 with Packed Leaching in a Packed Bed using DME

| Parameter | First Plastic PH #1 xLOQ | Purer Plastic PH #1 After DME Extraction xLOQ | Removal Efficiency % |
|---|---|---|---|
| Pesticides | | | |
| Piperonyl butoxide | 6.6 | <1 | >85% |
| Alkylphenol ethoxylates | | | |
| 4-t-Octylphenolhexaethoxylate | 17.4 | <1 | >94% |
| iso-Nonylphenoltriethoxylate | 32.0 | <1 | >97% |
| Alkylphenols | | | |
| iso-Nonylphenol | 300.0 | <1 | >99.7% |
| 4-tert-Pentylphenol | 1720.0 | <1 | >99.9% |
| Bisphenols | | | |
| Bisphenol A | 144 | 36.0 | 75% |
| Dioxins and dioxinlike and PCB | | | |
| 1,2,3,6,7,8-HxCDD | 7.4 | <1 | >86% |
| 1,2,3,4,6,7,8-HpCDD | 63.0 | <1 | >98% |
| OCDD | 308.5 | <1 | >99.7% |
| OCDF | 13.8 | <1 | >93% |
| PCB 105 | 116.4 | <1 | >99% |
| PCB 118 | 15.1 | <1 | >93% |
| Organotin compounds | | | |
| Monobutyltin | 3.0 | 2.0 | 33% |
| Dibutyltin | 11.7 | 2.3 | 80% |
| Phthalates | | | |
| Dibutyl phthalate | 32.0 | <1 | >97% |
| Di-2-ethylhexyl phthalate | 700.0 | <1 | >99.9% |
| Polycyclic aromatic hydrocarbons (PAH) | | | |
| Fluoranthene | 44.0 | <1 | >98% |
| Phenanthrene | 100.0 | 2.9 | 97% |

Example 5—Bulk Purification Using Packed Leaching in a Packed Bed of Ground Post-Commercial #3 with Ethyl Acetate A first plastic material, consisting of Post-Commercial Film #3 that had been melt densified using a single screw extruder to produce a 3-5 mm pellet and then ground to a mass average particle size between ~1 mm. Thus, the first plastic has a surface area to volume ratio of ~6 mm-1. This first plastic was fed to a bulk purification step of extraction involving Packed Leaching as follows (at Phasex Corporation, 125 Flagship Drive, North Andover, MA). About 121.8 g of the first plastic was loaded into a high pressure packed bed extractor having 500 mL total volume. The extraction was carried out at 70° C. and a pressure of about 10 atm. At all times, the mass ratio of ethyl acetate to first plastic in the packed bed was less than about 4:1. Ethyl Acetate was introduced to the packed bed at a rate of ~49 g/min for a ~28 minutes (ethyl acetate:first plastic mass ratio ~11.1:1), followed by a 60 min hold, followed by another stage of ~49 g/min for 46 minutes (ethyl acetate:first plastic mass ratio ~18.5:1). Net, the total fed of Ethyl Acetate to first plastic was ~30:1 and the total extraction time was ~133 minutes. The purer plastic was collected and had a mass of 120.1 g. The contaminant residue collected after evaporating the contaminated ethyl acetate was ~1.7 g. The purer plastic was analyzed for the classes of chemical contaminants typically present in recycled materials by GALAB Laboratories GmbH (Am Schleusengraben 7, 21029 Hamburg, Germany) using the methods disclosed in section IX Methods, as shown in Table 11.

For the contaminant 4-tert-pentylphenol, the removal efficiency was 79.3%. For the contaminant bisphenol A, the removal efficiency was 98.6%. For the contaminants OCDD, the removal efficiency was 98.9%. For the PCB 118, the removal efficiency was >99.6%. For the di-2-ethylhexyl phthalate, the removal efficiency was >94.4%. The average removal capacity for the contaminants, 4-tert-pentylphenol, bis-phenol A, OCDD, PCB 118, and di-2-ethylhexyl phthalate was >94.1%.

TABLE 11

Purification using Packed Leaching in a Packed Bed of
Ground Post-Commercial (PC) Film #3 with Ethyl Acetate

| Parameter | First Plastic PC #3 xLOQ | Purer Plastic PC #3 After Ethyl Acetate Extraction Packed Bed xLOQ | Removal Efficiency % |
|---|---|---|---|
| Pesticides | | | |
| Piperonyl butoxide | 28.0 | <1 | >96.4% |
| Alkylphenol ethoxylates | | | |
| 4-t-Octylphenolhexaethoxylate | 6.2 | <1 | >83.9% |
| iso-Nonylphenoltriethoxylate | 5.8 | <1 | >82.8% |
| Alkylphenols | | | |
| iso-Nonylphenol | 260.0 | 24.0 | 90.8% |
| 4-tert-Pentylphenol | 116.0 | 24.0 | 79.3% |
| Bisphenols | | | |
| Bisphenol A | 760.0 | 10.4 | 98.6% |
| Dioxins and dioxinlike and PCB | | | |
| 1,2,3,6,7,8-HxCDD | 6.1 | <1 | >83.6% |
| 1,2,3,4,6,7,8-HpCDD | 84.5 | <1 | >98.8% |
| OCDD | 205.0 | 2.2 | 98.9% |
| OCDF | 6.5 | <1 | >84.6% |
| PCB 105 | 157.2 | <1 | >99.4% |
| PCB 118 | 227.0 | <1 | >99.6% |
| Phthalates | | | |
| Dibutyl phthalate | 22.0 | <1 | >95.5% |
| Di-2-ethylhexyl phthalate | 17.8 | <1 | >94.4% |
| Polycyclic aromatic hydrocarbons (PAH) | | | |
| Fluoranthene | 63.0 | <1 | >98.4% |
| Phenanthrene | 62.0 | 2.6 | 95.8% |

Example 6—Combination of Surface Washing by Cadel De-Inking and Bulk Purification Using Packed Leaching in a Packed Bed with Post-Household Film #1 and scCO2

A first plastic material, in the form of shredded film consisting of the purer plastic from COMPARATIVE EXAMPLE 3B referred to in this example as purer plastic #1, was fed to a bulk purification step of extraction involving Packed Leaching as follows (at Phasex Corporation, 125 Flagship Drive, North Andover, MA). About 96.7 g of the first plastic was loaded into a typical supercritical $CO_2$ extractor with a volume of about 500 mL and the leaching was conducted at about 90° C., about 340 atm, and solvent to feed ratio of about 30 for approximately 3 hours. The pressure was then pulsed to 680 atm where an additional 30 volumes of solvent to polymer were introduced and held for another 3 hours to produce a purer plastic. The total $CO_2$ to first plastic mass ratio was about 60:1 for a total extraction time of about 360 minutes. At all times, the mass of $CO_2$ per mass of first plastic in the packed bed was less than about 4:1. The contaminated mass collected from the contaminated $CO_2$ was 1.8 g and the total mass of purer plastic was ~94.9 g. The surface area to volume ratio of the first plastic was approximately 80 mm-1. The purer plastic was analyzed for the classes of chemical contaminants typically present in recycled materials by GALAB Laboratories GmbH (Am Schleusengraben 7, 21029 Hamburg, Germany) using the methods disclosed in section IX Methods, as shown in Table 12. The purer plastic was significantly cleaner in all aspects. The combination of surface washing followed by bulk extraction produced a much cleaner recycle material. If a high custody or cleaner feed source were available, then this combination of cleaning methods would be even cleaner.

For the contaminant 4-tert-pentylphenol, the removal efficiency was >about 99.9%. For the contaminant bisphenol A, the removal efficiency was >99%. For the contaminants OCDD, the removal efficiency was 91%. For the PCB 118, the removal efficiency was >93%. For the di-2-ethylhexyl phthalate, the removal efficiency was 99%. The average removal capacity for the contaminants, 4-tert-pentylphenol, bis-phenol A, OCDD, PCB 118, and di-2-ethylhexyl phthalate was greater than about 96%.

TABLE 12

Purification involving both surface washing and bulk purification involving
Packed Leaching of Post-Household (PH) Film #1 in a Packed Bed with scCO2

| Parameter | First Plastic PH #1 xLOQ | Purer Plastic #1 PH #1 After De-inking xLOQ | EXAMPLE PH #1 After scCO2 Pulse xLOQ | Purer Plastic #2 PH #1 After De-inking and scCO2 Pulse xLOQ | Removal % After De-inking | Removal % After Extraction After scCO2 | Removal % After De-inking and Extraction After De-inking and scCO2 |
|---|---|---|---|---|---|---|---|
| Pesticides | | | | | | | |
| Piperonyl butoxide | 6.6 | 2.1 | <1 | <1 | 68% | >85% | >85% |
| Alkylphenol ethoxylates | | | | | | | |
| 4-t-Octylphenolhexaethoxylate | 17.4 | 1.38 | <1 | 1.3 | 92% | >94% | 93% |
| iso-Nonylphenoltriethoxylate | 32.0 | 10.2 | <1 | <1 | 68% | >97% | >97% |
| Alkylphenols | | | | | | | |
| iso-Nonylphenol | 300 | 130 | 46.0 | 8.0 | 57% | 85% | 97% |
| 4-tert-Pentylphenol | 1720 | 1060 | 66.0 | <1 | 38% | 96% | >99.9% |
| Bisphenols | | | | | | | |
| Bisphenol A | 144 | 11.0 | 26.0 | <1 | 92% | 82% | >99% |
| Dioxins and dioxinlike and PCB | | | | | | | |
| 1,2,3,6,7,8-HxCDD | 7.38 | 3.51 | <1 | 3.6 | 52% | >86% | 51% |
| 1,2,3,4,6,7,8-HpCDD | 63.0 | 31.0 | 11.8 | <1 | 51% | 81% | >98% |
| OCDD | 309 | 243 | 132 | 27.5 | 21% | 57% | 91% |
| OCDF | 13.8 | 12.9 | <1 | <1 | 7% | >93% | >93% |
| PCB 105 | 116.4 | 122.6 | 10.2 | <1 | 0% | 91% | >99% |
| PCB 118 | 15.1 | 176.0 | 12.8 | <1 | 0% | 15% | >93% |
| Organotin compounds | | | | | | | |
| Monobutyltin | 3.0 | dnt | 24.0 | 12.0 | n.a. | 0% | 0% |
| Dibutyltin | 11.7 | dnt | 7.0 | 3.0 | n.a. | 40% | 74% |
| Phthalates | | | | | | | |
| Dibutyl phthalate | 32.0 | 2.8 | <1 | <1 | 91% | >97% | >97% |
| Di-2-ethylhexyl phthalate | 700 | 188 | 48.0 | 3.8 | 73% | 93% | 99% |
| PAHs | | | | | | | |
| Fluoranthene | 44.0 | 24.0 | 80.0 | 53.0 | 45% | 0% | 0% |
| Phenanthrene | 100 | 53.0 | 42.0 | 7.2 | 47% | 58% | 93% |

Example 7—Combination of Surface Washing by Cadel De-Inking+Bulk Purification Involving Packed Leaching in a Packed Bed of Post-Household Film #1 Using Super Critical Ethane A first plastic material, consisting of the purer plastic from COMPARATIVE EXAMPLE 3B (surface area to volume ratio of 80 mm-1), was feed to a solid-liquid extraction involving Packed Leaching in a packed bed that involved 13 stages at 70C. About 100.7 g of the first plastic was loaded into the high pressure packed bed extractor of 500 mL total volume. At all times, the ratio of ethane to first plastic in the packed bed was less than about 4:1. The $1^{st}$ stage involved an ethane to first plastic mass ratio of about 1.6 and a time of about 9.6 minutes at a pressure of 340 atm. The second stage involved the evacuation of about 1.2 ethane to first plastic mass ratios of ethane to provide a pressure of 82 atm followed by introduction of 1.2 ethane to first plastic mass ratios of ethane to create a pressure of about 340 atm over a time period of about 14.6 minutes. The second stage was repeated five times. The $7^{th}$ stage involved an ethane to first plastic ratio of about 10.2 for about 61.2 minutes at about 340 atm. Stages 8 through 12 were replicas of the $2^{nd}$ through $6^{th}$ stages. The $13^{th}$ stage was a replica of the $7^{th}$ stage. The total ethane to first plastic mass ratio was about 34 and the total extraction time was about 278 minutes. The contaminated ethane was devolatilized to leave 3.5 g extracted from the first plastic and a purer plastic of ~97.2 g. The purer plastic was analyzed for the classes of chemical contaminants typically present in recycled materials by GALAB Laboratories GmbH (Am Schleusengraben 7, 21029 Hamburg, Germany) using the methods disclosed in section IX Methods, as shown in Table 13. The purer plastic was significantly cleaner than the heavily contaminated feed material. Except for dioxins and bisphenol-A, the chemical contaminants were removed almost to the LOQ. For the contaminant 4-tert-pentylphenol, the removal efficiency was about 97%. For the contaminant bisphenol A, the removal efficiency was 89%. For the contaminants OCDD, the removal efficiency was >99.7%. For the PCB 118, the removal efficiency was >93%. For the di-2-ethylhexyl phthalate, the removal efficiency was >99.8%. The average removal capacity for the contaminants, 4-tert-pentylphenol, bis-phenol A, OCDD, PCB 118, and di-2-ethylhexyl phthalate was greater than about 96%.

TABLE 13

Purification of Post-Household (PH) Film #1 using both Surface Washing
and Bulk Purification involving Packed Leaching in a Packed Bed with scEthane.

| Parameter | First Plastic PH #1 xLOQ | Purer Plastic #1 PH #1 After De-inking xLOQ | Purer Plastic #2 PH #1 After De-inking and scEthane Extraction xLOQ | Removal Efficiency % After De-inking | Removal Efficiency % After De-inking and Extraction |
|---|---|---|---|---|---|
| Pesticides | | | | | |
| Piperonyl butoxide | 6.6 | 2.1 | <1 | 68% | >85% |
| Alkylphenol ethoxylates | | | | | |
| 4-t-Octylphenolhexaethoxylate | 17.4 | 1.4 | <1 | 92% | >94% |
| iso-Nonylphenoltriethoxylate | 32.0 | 10.2 | <1 | 68% | >97% |
| Alkylphenols | | | | | |
| iso-Nonylphenol | 300.0 | 130.0 | 9.6 | 57% | 97% |
| 4-tert-Pentylphenol | 1720.0 | 1060.0 | 46 | 38% | 97% |
| Bisphenols | | | | | |
| Bisphenol A | 144.0 | 11.0 | 16.2 | 92% | 89% |
| Dioxins and dioxinlike and PCB | | | | | |
| 1,2,3,6,7,8-HxCDD | 7.4 | 3.5 | <1 | 52% | >86% |
| 1,2,3,4,6,7,8-HpCDD | 63.0 | 31.0 | <1 | 51% | >98% |
| OCDD | 308.5 | 243.0 | <1 | 21% | >99.7% |
| OCDF | 13.8 | 12.9 | <1 | 7% | >93% |
| PCB 105 | 116.4 | 122.6 | <1 | 0% | >99.1% |
| PCB 118 | 15.1 | 176.0 | <1 | 0% | >93% |
| Organotin compounds | | | | | |
| Monobutyltin | 3.0 | dnt | 5.3 | n.a. | 0% |
| Dibutyltin | 11.7 | dnt | 1.7 | n.a. | 86% |
| Phthalates | | | | | |
| Dibutyl phthalate | 32.0 | 2.8 | <1 | 91% | >97% |
| Di-2-ethylhexyl phthalate | 700.0 | 188.0 | <1 | 73% | >99.8% |
| PAHs | | | | | |
| Fluoranthene | 44.0 | 24.0 | 6.1 | 45% | 86% |
| Phenanthrene | 100.0 | 53.0 | 3.9 | 47% | 96% |

Example 8—Combination of Surface Washing by Cadel De-Inking and Bulk Purification Involving Packed Leaching in a Packed Bed Post-Household Film #1 with DME A first plastic material, consisting of purer film from COMPARATIVE EXAMPLE 3B, was fed to a bulk purification step of extraction involving Packed Leaching as follows (at Phasex Corporation, 125 Flagship Drive, North Andover, MA). About 101.5 g of the first plastic was loaded into a high pressure packed bed extractor of 500 mL. The first plastic had a surface area to volume ratio of ~80 mm-1. At all times, the mass of DME to mass of first plastic in the packed bed was less than about 4:1. The extraction was carried out at 70° C. and a pressure of 238 atm, DME was introduced to the packed bed at a rate of ~26 g/min for a total of 37 minutes (DME to first plastic ratio ~9.5:1), followed by a hold for one hour wherein no additional DME was added, followed by another stage involving a feed rate of ~26 g/min (DME to first plastic ratio ~15.8:1) for 62 minutes. Thus, the final solvent to polymer ratio was ~25:1 with an extraction time of 160 mins. The purer plastic was collected and had a mass of ~98.0 g with a contaminant residual of ~3.5 g. The purer plastic was analyzed for the classes of chemical contaminants typically present in recycled materials by GALAB Laboratories GmbH (Am Schleusengraben 7, 21029 Hamburg, Germany) using the methods disclosed in section IX Methods, as shown in Table 14. The purer plastic was significantly cleaner than the original heavily contaminated post-household material and cleaner than the surface washed version. Most chemical contaminants were reduced below the LOQ. All chemical contaminants were reduced to a level below approximately 10×LOQ despite starting levels being up to ~1700×. For the contaminant 4-tert-pentylphenol, the removal efficiency was about 99%. For the contaminant bisphenol A, the removal efficiency was >99.3%. For the contaminants OCDD, the removal efficiency was >99.7%. For the PCB 118, the removal efficiency was >94%. For the di-2-ethylhexyl phthalate, the removal efficiency was >99.9%. The average removal efficiency for the contaminants, 4-tert-pentylphenol, bis-phenol A, OCDD, PCB 118, and di-2-ethylhexyl phthalate was greater than about 98%.

TABLE 14

Purification of Post-Household (PH) Film #1 using both Surface Washing
and Bulk Purification involving Packed Leaching in a Packed Bed using DME

| | First Plastic PH #1 xLOQ | Purer Plastic #1 PH #1 After De-inking xLOQ | Purer Plastic #2 PH #1 After De-inking and DME Extraction xLOQ | Removal Efficiency % After De-inking | Removal Efficiency % After De-inking and DME Extraction |
|---|---|---|---|---|---|
| Pesticides | | | | | |
| Piperonyl butoxide | 6.6 | 2.1 | <1 | 68% | >85% |
| Alkylphenol ethoxylates | | | | | |
| 4-t-Octylphenolhexaethoxylate | 17.4 | 1.4 | <1 | 92% | >94% |
| iso-Nonylphenoltriethoxylate | 32 | 10.2 | <1 | 68% | >97% |
| Alkylphenols | | | | | |
| iso-Nonylphenol | 300 | 130 | <1 | 57% | >99.7% |
| 4-tert-Pentylphenol | 1720 | 1060 | 10.2 | 38% | 99% |
| Bisphenols | | | | | |
| Bisphenol A | 144 | 11.0 | <1 | 92% | >99.3% |
| Dioxins and dioxinlike and PCB | | | | | |
| 1,2,3,6,7,8-HxCDD | 7.4 | 3.5 | <1 | 52% | >86% |
| 1,2,3,4,6,7,8-HpCDD | 63.0 | 31.0 | <1 | 51% | >98% |
| OCDD | 308.5 | 243.0 | <1 | 21% | >99.7% |
| OCDF | 13.8 | 12.9 | <1 | 7% | >93% |
| PCB 105 | 116.4 | 122.6 | <1 | 0% | >99% |
| PCB 118 | 15.1 | 176.0 | <1 | 0% | >94% |
| Organotin compounds | | | | | |
| Monobutyltin | 3.0 | dnt | 4.3 | n.a. | 0% |
| Dibutyltin | 11.7 | dnt | <1 | n.a. | >91% |
| Phthalates | | | | | |
| Dibutyl phthalate | 32.0 | 2.8 | <1 | 91% | >97% |
| Di-2-ethylhexyl phthalate | 700 | 188 | <1 | 73% | >99.9% |
| PAHs | | | | | |
| Fluoranthene | 44.0 | 24.0 | 10 | 45% | 77% |
| Phenanthrene | 100.0 | 53.0 | 6.3 | 47% | 94% |

Example 9—Combination of Surface Washing by Cadel De-Inking and Bulk Extraction Involving Packed Leaching in a Packed Bed Using Surface Washed Post-Commercial Film #1 and DME A first plastic material, identical to the ground first plastic in COMPARATIVE EXAMPLE 3, was first pelletized using a single screw extruder operating at ~190C. The pellets were then ground with a cryogenic grinder to produce ground pellets having a mass average diameter of ~1 mm. Thus, the first plastic had a surface area to volume ratio of ~6 mm-1. This first plastic was fed to a bulk purification step involving packed leaching as follows (at Phasex Corporation, 125 Flagship Drive, North Andover, MA). About 119.0 g of the first plastic was loaded into a high pressure 500 mL packed bed extractor. At all times, the mass of DME to the mass of first plastic in the packed bed was less than about 4:1. The extraction was carried out at 70° C. and a pressure of 27 atm, DME was introduced to the packed bed at a rate of ~26 g/min for 34 minutes (DME to first plastic ratio of ~7.3:1), followed by a hold for 60 minutes, followed by another stage of ~26 g/min for 56 minutes (DME to first plastic ratio of ~12.2:1). Net, the total fed of DME to first plastic was ~20:1 and the total extraction time was 150 minutes. The purer plastic was collected and had a mass of 116.7 g with a contaminant residual of ~2.3 g. The purer plastic was analyzed for the classes of chemical contaminants typically present in recycled materials by GALAB Laboratories GmbH (Am Schleusengraben 7, 21029 Hamburg, Germany) using the methods disclosed in section IX Methods, as shown in Table 15. For the contaminant 4-tert-pentylphenol, the removal efficiency was about 96.5%. For the contaminant bisphenol A, the removal efficiency was >91.2%. For the contaminants OCDD, the removal efficiency was >93.7%. For the PCB 118, the removal efficiency was >98.1%. For the di-2-ethylhexyl phthalate, the removal efficiency was >89.8%. The average removal capacity for the contaminants, 4-tert-pentylphenol, bis-phenol A, OCDD, PCB 118, and di-2-ethylhexyl phthalate was treater than about 93.9%.

TABLE 9

Purification of Post-Commercial (PC) Film #1 using both Surface Washing
and Bulk Purification involving Packed Leaching in a Packed Bed with DME

| Parameter | First Plastic Post-Commercial #3 After Surface Washing xLOQ | Purer Plastic Post-Commercial #3 After Surface Washing and Extraction xLOQ | Removal Efficiency % |
|---|---|---|---|
| Pesticides | | | |
| Piperonyl butoxide | <1 | <1 | n.a. |
| Alkylphenol ethoxylates | | | |
| 4-t-Octylphenolhexaethoxylate | <1 | <1 | n.a. |
| iso-Nonylphenoltriethoxylate | <1 | <1 | n.a. |
| Alkylphenols | | | |
| iso-Nonylphenol | 136.0 | 10.0 | 92.6% |
| 4-tert-Pentylphenol | 480.0 | 16.8 | 96.5% |
| Bisphenols | | | |
| Bisphenol A | 11.4 | <1 | >91.2% |
| Dioxins and dioxinlike and PCB | | | |
| 1,2,3,6,7,8-HxCDD | <1 | <1 | n.a. |
| 1,2,3,4,6,7,8-HpCDD | 3.0 | <1 | >67.2% |
| OCDD | 15.9 | <1 | >93.7% |
| OCDF | 2.8 | <1 | >64.3% |
| PCB 105 | 42.2 | <1 | >97.6% |
| PCB 118 | 52.6 | <1 | >98.1% |
| Phthalates | | | |
| Dibutyl phthalate | <1 | <1 | n.a. |
| Di-2-ethylhexyl phthalate | 9.8 | <1 | >89.8% |
| Polycyclic aromatic hydrocarbons (PAH) | | | |
| Fluoranthene | dnt | <1 | n.a. |
| Phenanthrene | dnt | 1.5 | n.a. |

Example 10—Combination of Surface Washing by
Cadel De-Inking and Bulk Extraction Involving
Packed Leaching in a Packed Bed with
Post-Household Film #1 and DME The purer plastic from COMPARATIVE EXAMPLE 4, was pelletized using a single screw extruder operating at ~190C. The resulting pellets were cryogenically ground to a mass average particle size of ~1 mm. Thus, the first plastic had a surface area to volume ratio of ~6 mm-1. The first plastic was fed to a bulk purification involving packed leaching in a packed bed of 500 mL total volume as follows (at Phasex Corporation, 125 Flagship Drive, North Andover, MA). About 117.9 g of the first plastic was loaded into a high pressure packed bed extractor. At all times, the mass of DME to mass of first plastic in the packed bed was less than about 4:1. The extraction was carried out at 70° C. and a pressure of 27 atm, DME was introduced to the packed bed at a rate of ~26 g/min for 30 minutes (DME to first plastic ratio ~7.4:1), followed by a hold for 60 minutes, followed by another stage of ~26 g/min for 56 minutes (DME to first plastic ratio ~12.3:1). Net, the total fed of DME to first plastic was ~19.7 and the total extraction time was ~150 minutes. The purer plastic was collected and had a mass of 116.7 g and the contaminant mass collected was ~1.2 g. The purer plastic was analyzed for the classes of chemical contaminants typically present in recycled materials by GALAB Laboratories GmbH (Am Schleusengraben 7, 21029 Hamburg, Germany) using the methods disclosed in section IX Methods, as shown in Table 15. For the contaminant 4-tert-pentylphenol, the removal efficiency was about 99%. For the contaminant bisphenol A, the removal efficiency was 97.9%. For the contaminants OCDD, the removal efficiency was >99.7%. For the PCB 118, the removal efficiency was >93%. For the di-2-ethylhexyl phthalate, the removal efficiency was >99.9%. The average removal capacity for the contaminants, 4-tert-pentylphenol, bis-phenol A, OCDD, PCB 118, and di-2-ethylhexyl phthalate was greater than about 98%.

TABLE 16

Purification of Post-Household (PH) Film #1 using both Surface Washing and Bulk Purification involving Packed Leaching in a Packed Bed using DME

| Parameter | First Plastic PH #1 xLOQ | Second Plastic PH #1 After Washing xLOQ | Purer Plastic from Example 8 PH #1 After Extraction xLOQ | Purer Plastic PH #1 After Washing + Extraction xLOQ | Removal Efficiency % After Surface Washing | Removal Efficiency % After Extraction | Removal Efficiency % After Washing + Extraction |
|---|---|---|---|---|---|---|---|
| Pesticides | | | | | | | |
| Piperonyl butoxide | 6.6 | 8.4 | <1 | <1 | 0% | >85% | >85% |
| Alkylphenol ethoxylates | | | | | | | |
| 4-t-Octylphenolhexaethoxylate | 17.4 | 1.4 | <1 | <1 | 92% | >94% | >94% |
| iso-Nonylphenoltriethoxylate | 32.0 | 10.2 | <1 | <1 | 68% | >97% | >97% |
| Alkylphenols | | | | | | | |
| iso-Nonylphenol | 300 | 130 | <1 | 1.9 | 57% | >99.7% | 99.4% |
| 4-tert-Pentylphenol | 1720 | 1060 | <1 | 18.0 | 38% | >99.9% | 99.0% |
| Bisphenols | | | | | | | |
| Bisphenol A | 144 | 11.0 | 36.0 | 3.0 | 92% | 75% | 97.9% |
| Dioxins and dioxinlike and PCB | | | | | | | |
| 1,2,3,6,7,8-HxCDD | 7.4 | 3.5 | <1 | <1 | 52% | >86% | >86% |
| 1,2,3,4,6,7,8-HpCDD | 63.0 | 31.0 | <1 | <1 | 51% | >98% | >98% |
| OCDD | 308.5 | 243.0 | <1 | <1 | 21% | >99.7% | >99.7% |
| OCDF | 13.8 | 12.9 | <1 | <1 | 7% | >93% | >93% |
| PCB 105 | 116.4 | 122.6 | <1 | <1 | 0% | >99% | >99% |
| PCB 118 | 15.1 | 176.0 | <1 | <1 | 0% | >93% | >93% |
| Organotin compounds | | | | | | | |
| Monobutyltin | 3.0 | dnt | 2.0 | <1 | n.a. | 33% | >66.7% |
| Dibutyltin | 11.7 | dnt | 2.3 | <1 | n.a. | 80% | >91.4% |
| Phthalates | | | | | | | |
| Dibutyl phthalate | 32.0 | 2.8 | <1 | <1 | 91% | >97% | >97% |
| Di-2-ethylhexyl phthalate | 700.0 | 188.0 | <1 | <1 | 73% | >99.9% | >99.9% |
| PAHs | | | | | | | |
| Fluoranthene | 44.0 | 24.0 | <1 | <1 | 45% | >98% | >98% |
| Phenanthrene | 100.0 | 53.0 | 2.9 | 3.1 | 47% | 97.1% | 96.9% |

Example 11—Combination of Surface Washing and Bulk Extraction Involving Immersion Packed Leaching in a Hildebrandt Extractor with Ethyl Acetate A first plastic material, comprising shredded contaminated Post-Household film having a surface area to volume ratio of greater than about 50 mm-1, is fed into a surface purification step, comprising an aqueous surface washing step while applying vigorous mechanical agitation for a time of ~30 min; wherein the said surface washing step results in greater than about 80% of the loosely bound surface contamination. The resulting material is then conveyed into a Hildebrandt Immersion Packed leaching Extractor at 70C and atmospheric pressure using ethyl acetate as the packed leaching solvent. The ratio of ethyl acetate to first plastic is about 40:1 with an average total extraction time of about 120 minutes. At any point in time in the Hildebrandt Extractor, the mass ratio of ethyl acetate in contact with the first plastic is less than about 5:1. The plastic from the extractor is de-volatilized using mechanical cyclonic action and then transported to a vented single screw extruder where the material is melted, devolatilized, and melt filtered. The contaminated solvent from the extractor is purified using packed bed adsorption; wherein said contaminated solvent is distilled once every 10 times the solvent has been purified using packed bed adsorption. The resulting molten material is formed into a pellet and quenched with water or air. The resulting pellet is the purer plastic. The average removal capacity for the contaminants, 4-tert-pentylphenol, bis-phenol A, OCDD, PCB 118, and di-2-ethylhexyl phthalate is greater than about 55%.

IX. Methods

1. The following methods were used to measure the various chemical contaminants analytically. Pesticides: the EN 15662:2018-07 Modular QuEChERS-method was applied. For alkylphenol ethoxylates, alkyl phenols, and bisphenols the following technique was applied: the samples were cut, homogenized, and weighted; then, an internal standard (deuterated bisphenol A) was added, the samples were then extracted with hexane at room temperature, MSTFA (N-Methyl-N-(trimethylsilyl)trifluoroacetamide) was added for derivatization, and the contaminant level was determined by GC-MSD. For dioxins, furans, and PCBs: the ISO/IEC 17025:2005 method was applied. The samples were cut into small pieces, 13C/12C-labeled PCDD/F internal standards to an aliquot of the sample material were added, extraction and destroying of the matrix by hexane and $H_2SO_4$ for 1 h was employed, re-extraction with hexane (3 times for 30 min) was employed, multi-step chromatographic clean-up was applied, 13C/12C-labeled PCDD/F-recovery standards to the measurement solutions were added, and quantification via the internal labelled PCDD/F-standards (isotope dilution technique and internal standard technique) was applied. For organotins: the method followed the EDANA-Protocol (WSP 351) for organotin compounds in absorbent hygiene products and their constituent raw materials. More specifically, the samples were extracted with a sodium diethyldithiocarbamate solution in ethanol, alkylated with sodium tetraethyl borate, and transferred by extraction with hexane into the organic phase. Then, the tetrasubstituted organotin compounds were separated by using capillary gas chromatography, proven with an AED or MS as detector. GC-ICP-MS was used as detector system for the organometallic analysis. For phthalates: the samples were cut, homogenized, and weighted. An internal standard and extraction by hexane at room temperature were then employed. The extracted phthalates were then identified and quantified by GC-MSD. For PAHs: the samples were cut, homogenized, and weighted. Then, an internal standard of deuterated PAHs was added, and the samples were extracted with hexane. The extracted PAHs were purer with silica gel, concentrated, and then characterized by GC-MSD.

2. The amount of loosely bound surface contamination is determined by the following method: Approximately 20 grams of plastic are added to a 1,000 mL round bottom flask. Approximately 300 mL of distilled water are added to the 1,000 mL round bottom flask. The round bottom flask is capped and then vigorously shaken for about seconds. The water is decanted from the flask. Approximately 600 mL of additional distilled water are added to the 1,000 mL flask and then immediately decanted to leave the original first plastic with a small amount of water. The first plastic is removed from the round bottom and allowed to dry at 60C overnight in a convection oven. The % mass change of the plastic is the amount of loosely bound surface contamination.

3. Color measurements were obtained with a Minolta Spectrophotometer, Model CM580d. The 'white' portion of a Leneta card was used as a common background and as the reference point for delta E calculations. Delta E is the color difference (dE or ΔE), between a sample color and a reference color. Color measurements were taken using a D65 illuminant and a 10° observer. A minimum of three measurements were taken for each of the compressed thermoplastic starch composition samples. L, a, b values are averaged and reported along with ΔE values. ΔE values for the pure white Leneta card are zero and positive deviations from zero indicate increased discoloration. Those skilled in the art will know how to calculate the delta E value.

The foregoing description is given for clearness of understanding only, and no unnecessary limitations should be understood therefrom, as modifications within the scope of the invention may be apparent to those having ordinary skill in the art.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, comprising any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method to extract contaminates from a first polyolefin or polyolefin copolymer to produce a purer polyolefin or polyolefin copolymer comprising:
   a. providing a first polyolefin or polyolefin copolymer comprising individual contaminants, each individual contaminant having a concentration;
   b. extracting said individual contaminates from said first polyolefin or polyolefin copolymer at a temperature and a pressure, using a leaching solvent in extraction stages, wherein the total extraction time is less than about 6 hours, to produce a purer polyolefin or polyolefin copolymer comprising individual contaminates, each having a concentration;
      wherein said extraction is packed leaching wherein said temperature is between about 20 and 90° C.; wherein said extraction stages are conducted at a leaching solvent to first polyolefin or polyolefin copolymer mass ratio; wherein said leaching solvent to first polyolefin or polyolefin copolymer mass ratio per stage is less than about 5:1; wherein said pressure is about atmospheric; wherein said first polyolefin or polyolefin copolymer individual contaminants comprise at least one of 4-tertpentylphenol, bisphenol A, OCDD, PCB 118, and 2-ethylhexyl phthalate; wherein each individual contaminate concentration in said purer polyolefin or polyolefin copolymer is reduced compared to each individual contaminate concentration in said first polyolefin or polyolefin copolymer; and wherein the average of said reductions of said concentrations of said first polyolefin or polyolefin copolymer contaminants to said purer polyolefin or polyolefin copolymer contaminants is at least about 55% or LOQ; and
      wherein the leaching solvent does not significantly swell or dissolve the first polyolefin or polyolefin copolymer at the temperature and pressure of the process.

2. The method of claim 1, wherein said number of stages is between about 1 and about 50.

3. The method of claim 1, wherein said first polyolefin or polyolefin copolymer is a reclaimed polyolefin or polyolefin copolymer comprising at least one of a post-industrial or post-consumer film.

4. The method of claim 1, wherein said first polyolefin or polyolefin copolymer has a mass average surface area to volume ratio of at least about 1 mm-1.

5. The method of claim 1, wherein said first polyolefin or polyolefin copolymer is surface washed in a non-densified state by a surface washing process or processes prior to extraction and wherein said surface washing process or processes results in a greater than about an 80% reduction in loosely bound surface contamination; wherein said first polyolefin or polyolefin copolymer prior to surface washing has a surface area to volume ratio of greater than about 1 mm-1.

6. The method of claim 5, wherein said surface washing process is de-inking; wherein said de-inking process results in a delta E percent change of less than about 10% between the de-inked first polyolefin or polyolefin copolymer and the first polyolefin or polyolefin copolymer without surface printed ink.

7. The method of claim 1, wherein said period of time represented by the sum of times for the individual packed leaching stages is less than about 360 minutes.

8. The method of claim 1, wherein said leaching solvent is purified after said packed leaching or said packed leaching stage or stages to allow re-use in the packed leaching process by a solvent purification process or processes; wherein said solvent purification process or processes comprises at least one stage of physical adsorption or absorption of the chemical contaminants from the contaminated leaching solvent.

9. The method of claim 1, wherein said first polyolefin or polyolefin copolymer is a reclaimed polyolefin or polyolefin copolymer that is at least one of a post-industrial or post-consumer film; wherein said post-consumer film includes post-commercial film and/or post-household film.

10. The method of claim 1, wherein said packed leaching extraction is immersion leaching; wherein the leaching solvent completely fills the void volume in the first polyolefin or polyolefin copolymer.

11. The method of claim 1, wherein said packed leaching extraction is percolation leaching; wherein the leaching solvent does not completely fill the void volume in the first polyolefin or polyolefin copolymer.

* * * * *